(12) United States Patent
Smith et al.

(10) Patent No.: US 7,944,863 B2
(45) Date of Patent: *May 17, 2011

(54) ACCELERATED CHANNEL CHANGE IN RATE-LIMITED ENVIRONMENTS

(75) Inventors: Geoffrey R. Smith, Mountain View, CA (US); James A. Baldwin, Redwood City, CA (US); Michael D. Dodd, Mountain View, CA (US); Peter T. Barrett, San Francisco, CA (US); David C. Clifford, Santa Clara, CA (US); Grant D. Mohr, Burlingame, CA (US); Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/276,429

(22) Filed: Nov. 24, 2008

(65) Prior Publication Data

US 2009/0077255 A1 Mar. 19, 2009

Related U.S. Application Data

(63) Continuation of application No. 11/010,200, filed on Dec. 10, 2004, now Pat. No. 7,477,653.

(51) Int. Cl.
*H04J 3/26* (2006.01)
*H04B 7/216* (2006.01)
*H04J 3/22* (2006.01)

(52) U.S. Cl. ........ 370/265; 370/432; 370/480; 370/486; 370/543; 375/E7.023; 348/E7.071

(58) Field of Classification Search .......... 370/265–540; 709/206–226; 375/E7.023, 267; 348/E7.071, 348/584; 711/220; 715/714
See application file for complete search history.

(56) References Cited

U.S. PATENT DOCUMENTS 5,461,415 A 10/1995 Wolf et al.
(Continued)

FOREIGN PATENT DOCUMENTS

CA 2480461 A1 10/2003
(Continued)

OTHER PUBLICATIONS

"QuickTime Streaming your Media in Real Time," retrieved from the Internet on Nov. 3, 2005, accessible at <<http://www.apple.com.tw/quicktime/technologies/streaming/>>, pp. 3.

(Continued)

*Primary Examiner* — Afsar M. Qureshi
(74) *Attorney, Agent, or Firm* — Lee & Hayes, PLLC

(57) ABSTRACT

Accelerated channel change (ACC) strategies are described for supplying a client module with media information by transitioning between a first delivery of media information provided by first delivery functionality and a second delivery of media information provided by second delivery functionality without exceeding prescribed data rate limitations. The first delivery functionality can represent server-based functionality for delivering a unicast stream of media information at a data rate (or maximum data rate) of some excess amount over the nominal rate of delivery, starting at a selected location within the media information. The second delivery functionality can represent any functionality for delivering the media information at the data rate (or maximum data rate) of the nominal rate of delivery. A join interval separates the first delivery at the excess rate and the second delivery at the nominal rate. In that period, the first delivery functionality can provide media information at a join interval data rate. The join interval data rate, if it is below the nominal data rate, will cause the client module to miss packets of media information. The client module can receive these missing packets by issuing retry requests to the first delivery functionality or to some other entity. The client module can determine the excess amount available by investigating the amount of missing information that occurs at different data rates; or the excess amount can be defined in advance.

32 Claims, 14 Drawing Sheets

U.S. PATENT DOCUMENTS

| | | | |
|---|---|---|---|
| 5,473,362 | A | 12/1995 | Fitzgerald et al. |
| 5,583,868 | A | 12/1996 | Rashid et al. |
| 5,631,694 | A | 5/1997 | Aggarwal et al. |
| 5,699,362 | A | 12/1997 | Makam |
| 5,724,646 | A | 3/1998 | Ganek et al. |
| 5,732,217 | A | 3/1998 | Emura |
| 5,822,537 | A | 10/1998 | Katseff et al. |
| 5,884,141 | A | 3/1999 | Inoue et al. |
| 5,892,915 | A | 4/1999 | Duso et al. |
| 5,926,230 | A | 7/1999 | Niijima et al. |
| 5,936,659 | A | 8/1999 | Viswanathan et al. |
| 5,963,202 | A | 10/1999 | Polish |
| 6,047,317 | A | 4/2000 | Bisdikian et al. |
| 6,078,594 | A | 6/2000 | Anderson et al. |
| 6,118,498 | A | 9/2000 | Reitmeier |
| 6,138,147 | A | 10/2000 | Weaver et al. |
| 6,222,886 | B1 | 4/2001 | Yogeshwar |
| 6,266,817 | B1 | 7/2001 | Chaddha |
| 6,330,286 | B1 | 12/2001 | Lyons et al. |
| 6,418,473 | B1 | 7/2002 | St. Maurice et al. |
| 6,564,262 | B1 | 5/2003 | Chaddha |
| 6,580,754 | B1 | 6/2003 | Wan et al. |
| 6,637,031 | B1 | 10/2003 | Chou |
| 6,691,312 | B1 | 2/2004 | Sen et al. |
| 6,721,952 | B1 | 4/2004 | Guedalia et al. |
| 6,728,965 | B1 | 4/2004 | Mao |
| 6,738,980 | B2 | 5/2004 | Lin et al. |
| 6,751,129 | B1 | 6/2004 | Gongwer |
| 6,842,724 | B1 | 1/2005 | Lou et al. |
| 6,856,759 | B1 | 2/2005 | Fukuda et al. |
| 6,898,246 | B2 | 5/2005 | Katayama |
| 7,051,170 | B2 | 5/2006 | Guo |
| 7,106,749 | B1 | 9/2006 | Darshan et al. |
| 7,158,531 | B2 | 1/2007 | Barton |
| 7,219,145 | B2 | 5/2007 | Chmaytelli et al. |
| 7,334,044 | B1 | 2/2008 | Allen |
| 2002/0002708 | A1 | 1/2002 | Arye |
| 2002/0010938 | A1 | 1/2002 | Zhang et al. |
| 2002/0024956 | A1 | 2/2002 | Keller-Tuberg |
| 2002/0031144 | A1 | 3/2002 | Barton |
| 2002/0040481 | A1 | 4/2002 | Okada et al. |
| 2002/0107968 | A1 | 8/2002 | Horn et al. |
| 2002/0108119 | A1 | 8/2002 | Mao et al. |
| 2002/0114331 | A1 | 8/2002 | Cheung et al. |
| 2002/0124258 | A1 | 9/2002 | Fritsch |
| 2002/0143499 | A1 | 10/2002 | Kurosawa et al. |
| 2002/0144276 | A1 | 10/2002 | Radford et al. |
| 2002/0147979 | A1 | 10/2002 | Corson |
| 2002/0147991 | A1 | 10/2002 | Furlan et al. |
| 2002/0170067 | A1 | 11/2002 | Norstrom et al. |
| 2003/0037331 | A1 | 2/2003 | Lee |
| 2003/0060196 | A1 | 3/2003 | Levinberg |
| 2003/0093801 | A1 | 5/2003 | Lin et al. |
| 2003/0106053 | A1 | 6/2003 | Sih et al. |
| 2003/0158899 | A1 | 8/2003 | Hughes |
| 2003/0159143 | A1 | 8/2003 | Chan |
| 2003/0202594 | A1 | 10/2003 | Lainema |
| 2003/0202775 | A1 | 10/2003 | Junkersfeld et al. |
| 2004/0003399 | A1 | 1/2004 | Cooper |
| 2004/0034863 | A1 | 2/2004 | Barrett et al. |
| 2004/0034864 | A1 | 2/2004 | Barrett et al. |
| 2004/0049793 | A1 | 3/2004 | Chou |
| 2004/0098748 | A1 | 5/2004 | Bo et al. |
| 2004/0128396 | A1 | 7/2004 | Patrick et al. |
| 2004/0128694 | A1 | 7/2004 | Bantz et al. |
| 2004/0160971 | A1 | 8/2004 | Krause et al. |
| 2004/0160974 | A1 | 8/2004 | Read et al. |
| 2004/0255328 | A1 | 12/2004 | Baldwin et al. |
| 2005/0039214 | A1 | 2/2005 | Lorenz et al. |
| 2005/0071496 | A1 | 3/2005 | Singal et al. |
| 2005/0078680 | A1 | 4/2005 | Barrett et al. |
| 2005/0078757 | A1 | 4/2005 | Nohrden |
| 2005/0080904 | A1 | 4/2005 | Green |
| 2005/0081243 | A1 | 4/2005 | Barrett et al. |
| 2005/0081244 | A1 | 4/2005 | Barrett et al. |
| 2005/0081246 | A1 | 4/2005 | Barrett et al. |
| 2005/0097213 | A1 | 5/2005 | Barrett et al. |
| 2005/0128951 | A1 | 6/2005 | Chawla et al. |
| 2005/0154917 | A1 | 7/2005 | deCarmo |
| 2005/0172314 | A1 | 8/2005 | Krakora et al. |
| 2005/0190781 | A1* | 9/2005 | Green et al. ............ 370/432 |
| 2005/0240961 | A1 | 10/2005 | Jerding et al. |
| 2006/0089935 | A1 | 4/2006 | Clifford et al. |
| 2006/0117343 | A1 | 6/2006 | Novak et al. |
| 2006/0251082 | A1* | 11/2006 | Grossman et al. ........ 370/394 |
| 2007/0113261 | A1 | 5/2007 | Roman et al. |
| 2007/0121629 | A1 | 5/2007 | Cuijpers et al. |

FOREIGN PATENT DOCUMENTS

| | | |
|---|---|---|
| DE | 10206076(A1) | 8/2003 |
| EP | 0633694 A1 | 1/1995 |
| EP | 1294193 A1 | 3/2003 |
| EP | 1361690(A2) | 11/2003 |
| WO | 9806045 A1 | 2/1998 |
| WO | 9909741 A1 | 2/1999 |
| WO | 0009741 A1 | 2/2000 |
| WO | 0103373 A1 | 1/2001 |
| WO | 0126271 A2 | 4/2001 |
| WO | 0156285 A1 | 8/2001 |
| WO | WO0174076(A1) | 10/2001 |
| WO | WO02087235 | 10/2001 |
| WO | 02087235 A1 | 10/2002 |
| WO | 03088646 A2 | 10/2003 |
| WO | 2004062291 A1 | 7/2004 |

OTHER PUBLICATIONS

Wu, et al., "Scalable Video Coding and Transport over Broad-Band Wireless Networks.,"Proceedings of the IEEE, Jan. 2001, vol. 89, No. 1, pp. 6-20.

Wee, et al., "Splicing MPEG Video Streams in the Compressed Domain," IEEE 1997, pp. 224-230.

Ding. et al., "Resource-Based Striping: An Efficient Striping Strategy for Video Servers Using Heterogeneous Disk-Subsystems", Multimedia Tools and Applications, vol. 19, No. 1, Jan. 2003, pp. 29-51.

Gonzalez, et al., "Load Sharing Based on Popularity in Distributed Video on Demand Systems", Proceedings 2002 IEEE Int'l. Conf. on Multimedia and Expo, vol. 1, Aug. 2002, pp. 5-8.

Lee, "Staggered Push: ALinearly Scalable Architecture for Push-Based Parallel Video Servers," IEEE Transactions on Multimedia, vol. 4, no. 4, Dec. 2002, pp. 423-434.

Lo, et al., "Deploy Multimedla-on-Demand Services over ADSL Networks," PCM 2002, Lecture Notes in Computer Science, vol. 2532, Dec. 2002, pp. 295-302.

Song, et al., "Replica Striping for Multi-Resolution Video Servers," IDMS/PROMS 2002, Lecture Notes in Computer Science, vol. 2515, No. 2002, pp. 300-312.

"MediaFLO: Introducing FLO Technology." retrieved from the Internet on Nov. 3, 2005, available at <<http://www.qualcomm.com/mediaflo/news/pdf/flo_whitepaper.pdf>>, pp. 1-8.

"Optibase MGW 2400," retrieved from the Internet Nov. 3, 2005, available at <<http://www.epecomgraphics.com/optibase_mgw2400_features.html>>, pp. 2.

Armitage, "Support for Multicast over UNI 3.0/3.1 based ATM Networks", RFC 2022, Standards Track, Nov. 1996, pp. 1-82.

Halvorsen, et al., "Q-L/MRP: A Buffer Management Mechanism for QoS Support in a Multimedia DBMS", IEEE 1998,pp. 162-171.

Hurst, et al., "MPEG Splicing: A New Standard for Television-SMPTE 312M", SMPTE Journal, Nov. 1998, pp. 978-988.

Kamiyama, et al., "Renegotiated CBR Transmission in Interactive Video-on-Demand System.", IEEE 1997, pp. 12-19.

Lu, et al., "Experience in designing a TCP/IP based VOD system over a dedicated network", IEEE 1997, pp. 262-266.

McKinley, et al., "Group Communication in Multichannel Networks with Staircase Interconnection Topologies", Computer Communication Review, ACM, Sep. 1989, vol. 19, No. 4, pp. 170-181.

Petit, et al., "Bandwidth Resource Optimization in Video-on-Demand Network Architectures", IEEE 1994, pp. 91-97.

State, et al., "Active Network Based Management for QoS Assured Multicast Delivered Media", Joint 4th IEEE Int'l Conf. on ATM and High Speed Intelligent Internet Symposium, Apr. 2001, pp. 123-127.

"Digital Headend Solutions: Tune in to Digital TV", available at <<http://www.tutsystems.com/digitalheadend/solutions/index.cfm>>, accessed Nov. 3, 2005, p. 1.

"Infovalue Experts: Info Value Unveils Industry's First Video Multicasting Solution with Instant Replay", available at <<http://www.infovalue.com/links/news%20room/press%20releases/1999/Press_%20First_Multicasting_with_Instant_Replay.pdf>>, accessed Nov. 3, 2005, pp. 3.

Zhou, et al., "On-line Scene Change Detection of Multicast (MBone) Video", Proceedings of the SPIE,The International Society for Optical Engineering, Nov. 1998, vol. 3527, pp. 271-282.

Murphy, "Overview of MPEG", retrieved on Mar. 29, 2007, accessible at <<http://web.archive.org/web/20001203031200/http://www.eeng.dcu.ie/~murphyj/the/the/no...>>, pp. 3.

U.S. Appl. No. 11/010,200; Smith, et al.; Filed Dec. 10, 2004.

Chou, "Error Control for Receiver-Driven Layered Multicast of Audio and Video", IEEE Transactions on Multimedia, IEEE Service Center, Piscataway, NJ, US, vol. 3, No. 1, Mar. 2001.

Hurst, et al., "MPEG Splicing: A New Standard for Television-SMPTE 312M", SMPTE Journal, Nov. 1998, pp. 978-988.

Kalva, et al., "Techniques for Improving the Capacity of Video-On-Demand Systems", Proceedings of the Annual Hawaii International Conference on System Sciences, vol. 2, Jan. 3, 1996, pp. 308-315.

* cited by examiner

SCENARIO 1-A: Sample data consumption graph for rate-limited ACC ($E=.5$, $T_{burst} = 6$, $T_{join} = 1$)

SCENARIO 1-B: Sample data consumption graph for rate-limited ACC ($E=.25$, $T_{burst} = 6$, $T_{join} = 1$)

SCENARIO 3-A: Sample data consumption graph for rate-limited ACC ($E=.5$, $T_{burst} = 6$, $T_{join} = 1$)

SCENARIO 3-B: Sample data consumption graph for MulticastICC ($E=.25$, $T_{burst} = 6$, $T_{join} = 1$)

ACCELERATED CHANNEL CHANGE IN RATE-LIMITED ENVIRONMENTS

CROSS-REFERENCE TO RELATED APPLICATION

This is a continuation of U.S. patent application Ser. No. 11/010,200, filed on Dec. 10, 2004 and entitled, "ACCELERATED CHANNEL CHANGE IN RATE-LIMITED ENVORINMENTS", the entire contents of which are hereby incorporated by reference.

TECHNICAL FIELD

This subject matter relates to strategies for streaming media information to client modules in a manner which allows the client modules to quickly begin presenting the media information.

BACKGROUND

Traditional systems for delivering broadcast media information rely on the use of a physical tuner in a client module (e.g., a television set) that tunes to and receives the media information. In this traditional model, a user can quickly change channels, resulting in the virtual instantaneous transition from one program to another. And as such, the user does not typically perceive a delay in the presentation of a new program upon tuning to a new program. However, this simple manner of operation does not apply to the delivery of digital media information in streaming fashion over a network. In this environment, the client module typically must store a prescribed amount of media information in a buffer before it begins to play the media information to the user. It requires a certain amount of time to fill up this buffer when the user first connects to a stream of media information. Further, digital media information is commonly expressed as a series of key frames (e.g., I frames) and difference frames (e.g., B and P frames). A client module must wait for a key frame before it begins to present the media information. As a result of these factors, there will be a noticeable lag prior to the presentation of programs as the user switches from one channel to the next.

Microsoft Corporation of Redmond, Wash., has developed several strategies that reduce the effects of the above-noted problem in media streaming environments. These strategies are generally referred to as Accelerated Channel Change (ACC) paradigms herein, since they permit the client module to display a new program in an expedited manner when a user "tunes" to the new program (or when the user otherwise commences presentation of the new program). In these strategies, the head-end infrastructure delivers an initial burst which feeds a large quantity of media information to the client module via a communication channel, enabling it to begin presentation of the media information on an expedited basis. After the initial burst, the head-end infrastructure delivers the media information to the client module at a regular data rate (e.g., at or below a specified nominal data rate).

Generally, the ACC strategies make additional demands on the communication channels beyond that required to transmit the media information at its normal steady-state rate. A system can address these demands by allocating extra bandwidth to implement the ACC strategies. However, many environments allocate a limited amount of bandwidth to the communication channels. The application of ACC strategies in these kinds of environments may present various challenges. For example, there is a potential that the ACC strategies can overburden the communication channels, leading to their over-saturation. Such over-saturation of the channels can result in a poor quality of media presentation (e.g., due to the loss of an unacceptable number of media packets). Such over-saturation can also possibly result in the streams being dropped. For example, consider a household that includes various media presentation units that all "feed off" of a single communication channel. The ACC strategies have the potential of overburdening such a communication channel, particularly when multiple users in the household happen to be consuming media information at the same time (and also potentially invoking the ACC behavior at the time).

Other rate-limited environments may allocate a relatively large amount of bandwidth to the channels, thus reducing the potential of over-saturating the channels. It is nevertheless beneficial to adapt the ACC strategies in these environments so as to make efficient use of the allotted communication resources. In any environment, it is also beneficial to find ways to streamline the ACC protocol to make it less costly, less error prone, and more efficient.

For at least the above-identified reasons, there is a need for an improved paradigm for performing accelerated channel change (ACC) in rate-limited environments of all kinds.

SUMMARY

A method for delivering resource information to a client module is described herein. The method comprises: (a) delivering the resource information, using a first delivery technique, at above-nominal data rate levels during an initial burst period of data transmission to the client module; (b) delivering the resource information at join interval data rate levels during a join interval following the burst period, wherein, following the join interval, the client module switches to a second delivery technique for providing the resource information; and (c) responding to requests from the client module to supply parts of the resource information which the client module potentially missed during the join interval as a result of its receipt of the resource information at the join interval data rate levels.

Additional exemplary implementations are described in the following.

Figure 1:
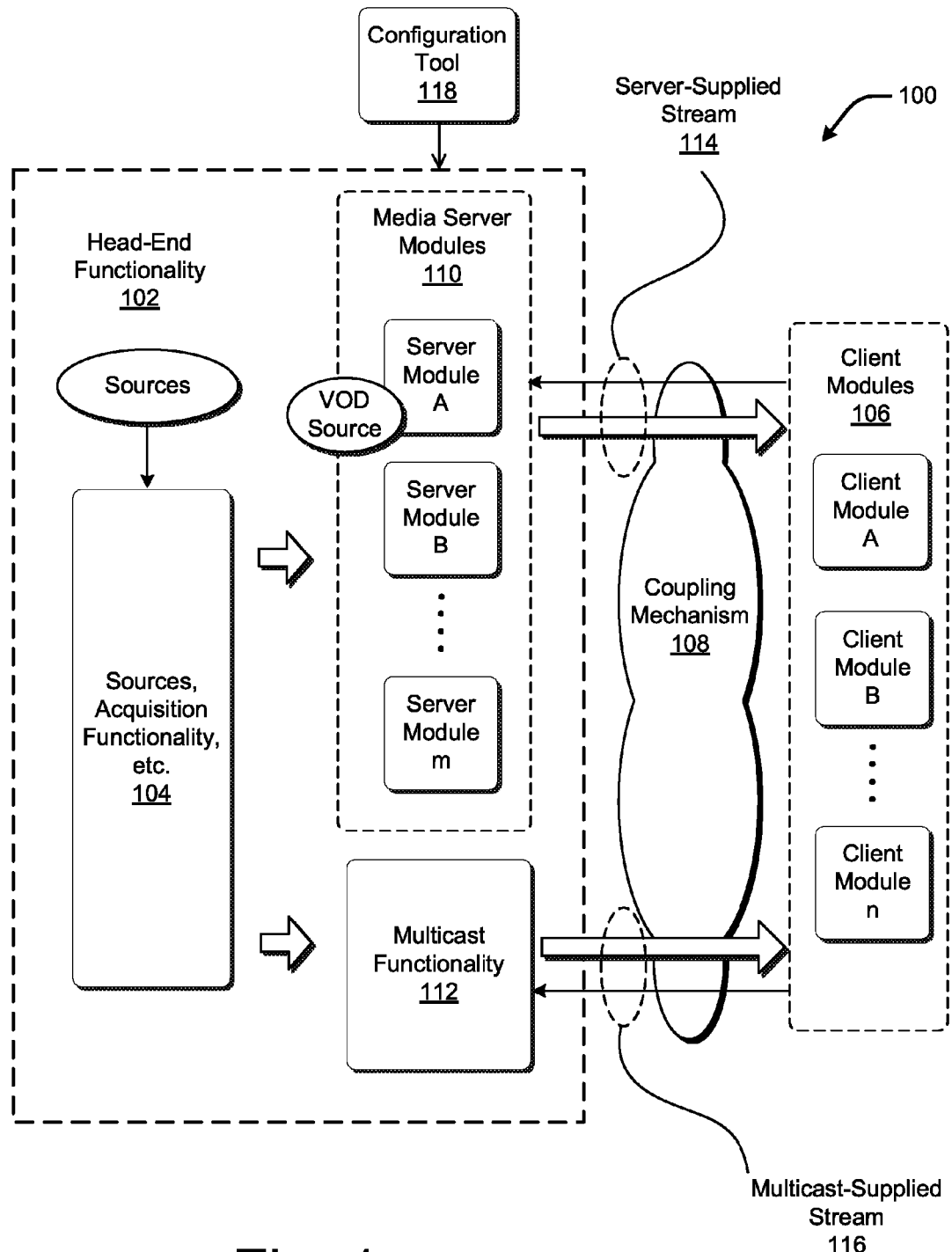
FIG. 1 shows an exemplary system which can employ an improved rate-limited ACC paradigm.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth a strategy for allowing a client module to transition from a first mode of delivering resource information (delivered by first resource delivery functionality) to a second mode of delivering resource information (delivered by second resource delivery functionality) in such a manner that an amount of resource information received by the client module per time interval does not exceed a prescribed maximum bandwidth. In one exemplary implementation, the first mode of delivery uses a server module to provide a unicast stream of media information delivered at burst data rate levels, and the second mode of delivery uses multicast functionality to provide a multicast stream of the media information at nominal data rate levels. The strategy described herein can be invoked when a user wishes to commence the presentation of a stream of media information, such as when the user switches from one first program to another program. In another exemplary implementation, the first mode of delivery uses the server module to provide the unicast stream at the burst-data rate levels, and the second model of delivery also uses the server module to provide the unicast stream, but at the nominal data rate levels.

The strategy described herein confers a number of benefits. For instance, the strategy is particularly advantageous in those environments characterized as "rate-limited environments." These environments allocate the client module (or group of client modules) a prescribed amount of bandwidth to receive one or more streams of media information. By maintaining the amount of consumed bandwidth below the prescribed data rate level, the strategy accommodates the use of an accelerated channel change burst without exceeding the capacity of the communication channel. This, in turn, reduces the chances that one or more streams of resource information will be dropped (or otherwise degraded) as a result of the accelerated channel change behavior.

Other features and attendant benefits of the strategy will be set forth in the following disclosure. Generally, this disclosure sets forth the strategy by first explaining the application of the strategy to an environment that delivers resource information at a constant data rate to client modules using a hybrid unicast/multicast ACC technique. Further, some examples assume that the amount of excess capacity provided by the communication channel is less than a nominal data rate of the resource information (so that two full nominal data rate streams cannot "fit" onto the communication channel at the same time). As to the issue of bit rate, the constant data rate implementation provides a convenient pedagogical vehicle for visualizing the functional interdependencies involved in the strategy. For instance, assuming that a constant data rate is available for delivery of resource information, the different stages in the transition from the first mode of delivery to the second mode delivery can be depicted as rectangular blocks on a bandwidth-versus-time graph. However, the strategy can also be applied to other types of environments. For instance, the analysis also applies to worst-case assumptions for the case of capped variable bit rate (VBR) delivery (where the resource information is delivered at the maximum data rate permitted). Moreover, the strategy can be applied to environments that allocate a relatively large amount of bandwidth (such as two times the nominal data rate or greater). Data rate limitations may not present a significant design challenge in these environments, but such environments can benefit from the efficiency at which the ACC strategy transitions from one mode of delivery to another, as well as other merits of the strategy.

As to the issue of excess capacity, the strategy can also be applied to communication channels that allocate a relatively large amount of excess capacity, including excess capacity equal to or greater than the nominal bit rate of the stream which corresponds to a total capacity equal to or greater than two times the nominal bit rate of the stream. As will be described, the use of large levels of excess capacity to deliver resource information can reduce (or eliminate) the amount of missed packets caused by the transition from the first mode of delivery to the second mode of delivery, and therefore may reduce the need for retries following the transition from the first mode to the second mode.

As to the issue of delivery modes, the strategy can be applied to other environments which transition between other kinds of modes of delivery, such as in the case of the pure unicast delivery model described above (where the different modes correspond to two different delivery phases of the same unicast delivery mechanism).

As to terminology, the term "resource information" refers to any data represented in electronic form that can be consumed by a user. The resource information may include, or may omit, interactive content. A specific class of resource information may pertain to media information. The media information can include any information that conveys audio and/or video information, such as audio resources (e.g., music, etc.), still picture resources (e.g., digital photographs, etc.), moving picture resources (e.g., audio-visual television programs, movies, etc.), computer programs (e.g., games, etc.), and so on.

The term "stream" refers to the representation of the resource information as time-sequenced flow of the resource information. A client module can consume a stream of resource information in piecemeal fashion as it is received, as opposed to requiring the client module to receive the entire body of the resource information (e.g., as a single file) before consuming the resource information.

The term "communication channel" broadly refers to the resources that a system uses for handling communication between a particular source module and a particular client module.

The term "unicast" refers to the delivery of resource information between a server module and a client module in one-to-one fashion, where specific resources are allocated to the unicast delivery for that particular client module. The term "multicast" refers to the delivery of resource information to potentially multiple client modules in a manner that does not require per-client allocation of communication resources (and particularly, does not require per-client allocation of server resources). The term "multicast" may encompass certain types of Internet Protocol (IP) multicasting technologies, such as the Internet Group Management Protocol (IGMP), but is not limited to such specific multicasting technologies. As very broadly used herein, the term "multicast" is generally synonymous with the term "broadcast."

The term "accelerated channel change (ACC)" refers to any paradigm for allowing a client module to begin presenting a stream of resource information on an expedited basis. The term "rate-limited ACC" refers to the novel strategy summarized above, which permits a client module to switch between first delivery functionality and second delivery functionality in a manner which does not exceed prescribed bandwidth limitations. The term "rate-limited hybrid unicast/multicast ACC" refers to the specific application of the rate-limited ACC strategy to the task of switching from a unicast stream delivered by unicast delivery functionality to a multicast stream delivered by multicast delivery functionality.

The term "nominal" refers to the maximum allowable steady-state bandwidth the stream is designed to fit within. For example, a stream encoder may create the resource information such that it can be continuously delivered and presented while utilizing no more than the nominal bit-rate for delivery, and without interruption of presentation of the resource information, assuming the client module presents resource information no earlier than the time specified by the stream.

The term "data rate levels" (as in, for example, "first data rate levels," "second data rate levels," etc.) can refer to a series of constant or varying data rates that conform to some pattern or criterion. For instance, the second mode of delivery (multicast) provides the resource information at "second data rate levels," meaning generally herein that it delivers the resource information at levels conforming to a nominal data rate. In the case of a constant data rate environment, the second data rate levels might describe the "flat" delivery of the resource information at the nominal data rate itself. In variable data rate environments, the second data rate levels will be permitted to vary below a ceiling defined by the nominal data rate.

The term "maximum rate" or "MaxRate" refers to a total amount of bandwidth that a channel allocates to handling information exchange.

The term "excess data rate" or "excess capacity" refers to available bandwidth in a communication channel that can be used to handle the special provisions involved in the ACC strategy. For example, a channel might devote a maximum data rate of MaxRate to handling all information exchange over the communication channel. At a given time, the steady-state consumption of a multicast stream of resource information might be ActualCurrentMulticastRate. The excess data rate is then MaxRate−ActualCurrentMulticastRate. That excess data rate can be used for handling the special provisions of the ACC strategy, such as handling retries to account for the packets lost when transitioning from the first mode of delivery to the second mode delivery. For constant data rate delivery, the excess capacity can be represented as a constant amount. For variable data rate delivery, the excess capacity will vary (because the amount of bandwidth consumed by the steady-state delivery will vary). In this disclosure, the term "excess data rate" or "excess capacity" refers to excess data rate in units of information quantity per time unit. For steady-state delivery (and for capped VBR delivery when delivering data at the nominal rate), the excess data rate can also be expressed as a fraction E of the nominal data rate (also referred to as the "fractional excess capacity" or "fractional excess data rate" herein).

A "primary mode of delivery" of resource information refers to a mode used to deliver the bulk of the resource information being consumed by a client module at any given time. For instance, the client module may be receiving a stream of resource information from a multicast mode of delivery, while still relying on a unicast mode of delivery to receive missing packets in response to retry requests. In this case, the multicast mode of delivery would comprise the primary mode of delivery, since it provides the bulk of the stream of resource information. The ACC strategy described herein involves the transition from one primary mode of delivery to another.

This disclosure includes the following sections. Section A describes an exemplary system for implementing the rate-limited ACC strategy. Section B describes the manner of operation of the system of Section A. Section C describes variations to the implementations described in Sections A and B. And Section D describes an exemplary computer environment for implementing aspects of the systems of Section A.

A. Exemplary System

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations. As used herein, the terms "first functionality" and "second functionality" can correspond to different physical mechanisms for delivering resource information, or the same physical mechanism operating under different conditions.

A.1. Overview of an Exemplary System that Implements Rate-Limited ACC for the Constant and Capped VBR Delivery of Resource Information The system 100 shown in FIG. 1 represents one exemplary and non-limiting system that can be used to implement the rate-limited ACC strategy, corresponding generally to functionality developed by Microsoft Corporation to deliver media information (such as television programs, movies, pictures, audio resources, etc.) in streaming fashion to users. However, the rate-limited ACC strategy can be implemented on many other types of systems. Namely, the rate-limited ACC strategy described herein can be employed in any system that involves a source module (referred to herein as a server module) which delivers resource information to a target module (referred to as a client module) in streaming fashion. The examples developed in Section A pertain particularly to the delivery of resource information at a constant data rate. The analysis also applies to worst-case assumptions for the case of capped variable bit rate (VBR) delivery (where the resource information is delivered at the maximum data rate permitted). Section C below describes variations of the concepts developed herein.

By way of overview, the system 100 includes head-end functionality 102, which comprises acquisition functionality 104 for delivering resource information to a collection of client modules 106 via a coupling mechanism 108. The acquisition functionality 104 can receive information from one or more sources. The sources can represent any kind of entity which produces or provides information, such as conventional cable or satellite television providers, one or more Video-On-Demand (VOD) suppliers of information, one or more publishing houses of information, one or more library sources of information, any kind of Internet-enabled repository of information, and so on. In general, the sources can supply live information or prerecorded information. Live information corresponds to information that captures a current state of an ongoing event (such as a sporting event which is being televised live). Prerecorded information corresponds to information that has already been recorded. (The information may have been recorded in its entirety, before it is delivered to the client modules, or the information may be recorded as it is being delivered, there being a time lag between recordation and delivery.) The acquisition functionality 104 itself can comprise one or more server computers, dedicated hardware, or other mechanism dedicated to the task of retrieving the resource information and (optionally) storing the resource information prior to dissemination to the server modules 106.

The system 100 can use any kind of coupling mechanism 108 to couple the head-end functionality 102 to the client modules 106. For instance, the coupling mechanism 108 can include any kind of network (or combination of networks), such as a wide area network (e.g., the Internet), an intranet, Digital Subscriber Line (DSL) network infrastructure, point-to-point coupling infrastructure, and so on. The coupling mechanism can use or involve any kind of protocol or combination of protocols, such as the Internet Protocol (IP), the Transmission Control Protocol (TCP), the User Datagram Protocol (UDP), the HyperText Transfer Protocol (HTTP), the Simple Object Access Protocol (SOAP), the Real Time Transport Protocol (RTP), Real Time Streaming Protocol (RTSP), and many potential others. In the case where one or more digital networks are used to disseminate information, the coupling mechanism 108 can include various hardwired and/or wireless links, routers, gateways, name servers, and so on. In the case where DSL infrastructure is used to disseminate information, the coupling mechanism 108 can utilize the services, in part, of telephone coupling infrastructure and DSL processing functionality. The rate-limited ACC solutions described herein are not technology-dependent, meaning that these techniques can "sit on top" of different protocols and technologies, or otherwise integrate and interact with such protocols and technologies.

The head-end functionality 102 relies on a combination at least two different delivery systems to deliver the resource information supplied by the acquisition functionality 104 (or supplied by some other source). (Although, as will be described in Section C, the ACC strategy can also be performed using a single delivery mechanism.) First delivery functionality comprises a collection of server modules 110 for delivering a first stream of resource information to the client modules 106. Second delivery functionality comprises multicast functionality 112 for delivering a second stream of the resource information to the client modules 106. The construction and cooperative operation of the server modules 110 and multicast functionality 112 are explained in greater detail below.

Each client module can interact with the head-end functionality via a communication channel. As broadly used herein, the term "communication channel" represents the resources that the system 100 uses for handling the communication between a particular client module and the head-end functionality 102. The resources that comprise the communication channel may include functionality supplied by the head-end functionality 102, resources provided by the coupling mechanism 108, and/or functionality provided by the client modules 106 themselves.

The system 100 is a rate-limited environment. This means that there are threshold limits that restrict the amount of resources that the system 100 allocates to each communication channel, which place restrictions on the bandwidth of each communication channel. For example, assume that client module A is coupled to the head-end functionality 102 by a collection of system resources that define a communication channel as broadly used herein. The system 100 imposes a limit on the amount of resource information in a single stream that can be fed to module A. Or assume that client module A has the capacity to display plural streams of resource information at the same time (which might be the case, for example, where client module A has the capacity to provide a picture-in-picture presentation). In this case, the system 100 imposes a limit on the combined amount of information supplied by plural streams of resource information that can be consumed at any time.

In another example, assume that plural communication modules (e.g., client module A and client module B) are allocated to a single communication channel to interact with the head-end functionality 102. This scenario can correspond to the case where the system 100 allocates a prescribed amount of communication resources that a household containing plural media presentation units can use to interact with the head-end infrastructure 102. In this case, the system 100 imposes a limit on the amount of resource information that can be supplied to the plural client modules at the same time.

In one exemplary implementation, the system 100 can implement its rate constraints by allocating a certain amount of bandwidth over an amount of bandwidth required to deliver the stream in a steady-state condition. Stated generally, assume that a communication channel allocates a total amount MaxRate of bandwidth to a communication channel. The excess capacity as a function of time can therefore be expressed as Excess(t)=MaxRate−ActualCurrentRate(t), where Excess(t) refers the amount of excess bandwidth as a function of time, and ActualCurrentRate(t) refers to the amount of bandwidth being consumed to deliver the resource information in its steady state condition as a function of time. (MaxRate can potentially change as a function of time too.) For the case of constant data rate delivery, the ActualCurrentRate can be assumed to be constant, so the excess amount can also be assumed to be constant. (Such simplifications can also be made in the case of capped VBR to provide analysis results for worst-case assumptions.) In these scenarios, one way to express the excess capacity is by forming a fractional excess capacity value E, defined with respect to the nominal data rate of the stream. For instance, if the system 100 allocates 30 percent beyond that which is required to deliver the stream at the nominal data rate, then E would be 0.3. In this way of representing the excess capacity, the system 100 allocates a total amount of bandwidth of (1+E)*Nominal to the communication channel, where E represents the fractional amount of excess capacity of the communication channel above and beyond what is required to deliver the resource information in the steady-state condition (Nominal). (Again, the nominal data rate (Nominal) refers to the peak data rate at which the stream is expected to be delivered in the steady-state condition.)

The system 100 can select the parameter E in different ways. In one case, the system 100 can be pre-provisioned to operate using a prescribed value for E. Different values of E may be appropriate for different streaming environments, depending on various technical and business considerations. As noted above, in one exemplary and non-limiting environment, E can be selected such that each communication channel is configured to operate at approximately 30 percent over the nominal rate which is required to present a stream of resource information in normal conditions. Many other values can be selected for E. If E is set at 100 percent, then the system can accommodate two complete versions of the stream at the same time. The fact that E is less that 1.0 has certain consequences which will be set forth in detail below. As will be described in Section C, E can also be greater than 1.0, with the consequences set forth in that section.

In another case, the system 100 can automatically determine the level E. For example, a client module can progressively increase the data rate at which it interacts with the head-end functionality 102. The communication channel has certain limitations regarding how much data it can stream to the client module. This means that the system 100 will perform progressively worse near the limits of the channel's capacity. Namely, the communication channel will begin to "drop" packets. To remedy the problem of lost packets, the client module will send retry requests to the head-end functionality 102 to ask for the missing packets. However, as the data rate increases, the system 100 may be unable to fill in the missing packets using this retry mechanism before the packets are consumed by the client module's decoder. The missing packets are referred to as "holes" herein. The consumption of resource information with "holes" produces a presentation having poor quality.

Further, the operation of sending retry requests to a server module and supplying retry packets to the client module itself obviously consumes the resources of the communication channel, potentially overtaxing the communication channel yet further. If the data rate increases to a certain level beyond the capacity of the communication channel, the loss of packets and the consequent flood of retry information can cause a deleterious feedback loop, leading to a state referred to as a packet storm. Such a condition can completely disable the presentation of the stream.

In any event, the client module can determine the level E by iteratively increasing the data rate, determining the level of packet loss at each data rate, and selecting the value E at which the level of packet loss is acceptable, but beyond which becomes unacceptable. The floor for the value E is effectively 0 percent, which yields the nominal rate of the stream.

Once the value of E is established, the main objective of the system 100 is to supply resource information to the client modules 106 in a manner which does not exceed the prescribed rate limits. To carry out this objective, the system 100 must ensure that the streams of resource information supplied by the server modules 110 and the multicast functionality 112 are combined in such a manner that the aggregate demand on communication resources never exceeds the prescribed data rate limit. This provision is advantageous because it prevents the system 100 from inundating the communication channels with too much resource information. It therefore prevents too many packets from being dropped, and the consequent degradation in resource presentation when the decoder consumes such resource information having holes. It further helps prevent the extreme case where one or more streams are simply dropped altogether because the system 100 becomes too overburdened.

The precise manner of combining the streaming output of the server modules 106 and the multicast functionality 112 will be set forth in greater detail below. As a preliminary matter, the description will provide more explanation pertaining to the configuration and operation of the server modules 110 and the multicast functionality 112.

The server modules 110 can include one or more server computers (e.g., a so-called "farm" of computer devices) or other mechanisms. The server modules 110 can each basically perform the same functions. Routing functionality and/or load balancing functionality (not shown) can assign any of one of the server modules 110 to provide services to any one of the client modules 106. Due to use of redundant components at the head-end functionality 102, the following discussion will often revert to the singular when discussing the server modules 110. Indeed, it should be noted that the system 100 can function with even one server module.

From a high level perspective, the server modules 110 perform two basic roles: (1) sending a burst of resource information upon commencement of the stream; and (2) handling retry requests from the client modules 106. As to the first role, these server modules 110 are responsible for supplying the resource information to the client modules 106 when the client modules first "tune to" resource information. Such initial events occur when the user turns on a client module to consume whatever program happens to be presented on an initial channel; such initial events also occur when the user switches channels, thereby tuning to a new program. The goal of the server modules is to feed a client module resource information on an expedited basis when the client module first tunes to a stream of the resource information. This, in turn, enables the client module to present the resource information more quickly, e.g., hopefully fast enough so that the user will not experience a delay when changing channels.

In one exemplary and non-limiting implementation, a server module performs the expedited buffer-fill operation by streaming the resource information to a client module at the full capacity of the communication channel that couples the server module to the client module. In other words, the server module sends an initial burst of resource information at a level (1+E)*Nominal, meaning that the burst is performed at the normal nominal rate of the stream plus some fractional rate E times the nominal rate of the stream. According to another feature, the server module supplies this burst to the client module in a unicast fashion, meaning that the server module generally devotes resources to communicate with the client module on a one-to-one basis. The unicast can be performed using "datagram" connectionless style communication, such as UDP. The unicast can alternatively be performed using TCP, or some other protocol or mechanism. As will be explained in greater detail in connection with FIG. 2, the server module also starts the unicast burst at a key frame of the resource information. This allows the client module to immediately begin presenting the resource information (because, without this provision, the client module would otherwise have to wait until it received a key frame if it initially received a series of difference frames).

FIG. 1 generally illustrates the unicast coupling between a server module and a client module by the unicast stream 114. This stream 114 has two components. The larger of the two arrows represents the transmission of a stream of resource information to the client module in unicast fashion. The stream can comprise a plurality of packets, each containing pieces of the resource information (e.g., one or more frames of audio-video information). The resource information can be expressed using any standard, such as MPEG-2, among many other standards. The client module that receives the stream of resource information can reconstruct the resource information based on the received packets. The smaller of the two arrows represents any commands and other information that are transmitted by the client module to the server module. For example, the client module can send retry requests to the server module. The client module will generate retry requests when it determine that it has missed one or more packets in the stream of information supplied by the server module based on holes in the received information. (Alternatively, as will be described in Section C, the client module can rely on another entity to receive missing packets.)

In connection with these retry requests, the second role performed by the server module is to honor such retry requests (if possible) by supplying any packets of missing resource information to the requesting client module. In one implementation, the server module can place the retry packets into the stream of resource information that it supplies to the client module, although, in one exemplary implementation, the retry packets are not otherwise distinct from new (first-transmitted) packets in the stream. (In an alternative exemplary implementation, the retry packets are distinct from the first-transmitted packets.) Upon receiving the retry packets, the client module can insert them into their proper location in the client module's buffer. The client module can order the packets based on sequence numbers associated with the packets.

On the other hand, the multicast functionality 112 performs the basic role of delivering resource information to the client modules 106 in a multicast mode. As broadly used herein, the term multicast refers to the transmission of resource information to a client module in any manner that does not require one-to-one allocation of head-end resources to the client module. One kind of multicast functionality 112 can be implemented using the Internet Group Management Protocol (IGMP). IGMP functionality can supply resource information to a group of recipients by a tree of distribution nodes which receive the resource information from an ultimate source. A new client module can join the ongoing multicast by tapping into the multicast distribution; it can perform this task by locating an appropriate distribution node within the tree of such nodes. Indeed, in the system 100 of FIG. 1, both the server modules 110 themselves and the client modules 106 can couple to a multicast distribution framework which ultimately receives resource information from the acquisition functionality 104. However, the IGMP protocol is merely one non-limiting strategy for sending resource information in a multicast fashion to the client modules. The term multicast transmission should be construed to encompass any kind of broadcast (non-unicast) transmission of resource information, including, for instance, broadcast satellite transmission of resource information.

In one case, a single head-end infrastructure can supply logic which implements both the server modules 110 and the multicast functionality 112. In another case, two different infrastructures can be devoted to implementing the server modules 110 and the multicast functionality 112. These server modules 110 and multicast functionality 112 can be maintained and operated by the same commercial entity, or different respective commercial entities.

However implemented, FIG. 1 generally illustrates the multicast coupling between the multicast functionality 112 and one of the client modules 106 by the multicast stream 116. This stream 116 has two components. The larger of the two arrows represents the transmission of a stream of resource information to the client module in multicast fashion. Again, the stream can comprise a plurality of packets, each containing pieces of the resource information (e.g., one or more frames of audio-video information). The client module that receives the stream of resource information can reconstruct the resource information based on the received packets. The smaller of the two arrows represents any commands or information that is transmitted by the client module to the multicast functionality 112. For example, the client module can issue a join request via this route to ask the multicast functionality 112 if the client module may join an ongoing multicast stream.

With the above preliminary explanation, more can be said on how the head-end functionality 102 presents the unicast stream 114 and the multicast stream 116 in such a manner so as not to exceed the rate limit, e.g., $(1+E)*$Nominal. To review, upon a change event (e.g., when a client module tunes to a new program), a server module comes into action by sending a burst of unicast resource information at the exemplary rate of $(1+E)*$Nominal. This burst rapidly fills up the buffer of the client module and then terminates. Near the end of the burst, the server module will instruct the client module to switch to the multicast stream 116. The client module will comply by sending a request to the multicast functionality 112, asking to connect to the multicast stream 116. When this connection is established, the client module then receives the multicast stream from the multicast functionality 112 at less than or equal to the nominal data rate (Nominal). (That is, this section assumes that the multicast rate remains steady at Nominal, but it need not. In other cases, the multicast rate will vary but will be capped at the Nominal rate. Section C sets forth an implementation which takes advantage of this fact by dynamically computing the excess capacity in the channel due to the varying multicast data rate.)

In summary, the ACC strategy therefore has the effect of transitioning from a first mode of delivery of the resource information (e.g., unicast via the server module) to a second mode of delivery of the resource information (e.g., multicast via the multicast functionality 112). The use of the terms "unicast stream" 114 and "multicast stream" 116 should not obscure the fact that these streams contain the same pieces of data delivered using different delivery techniques.

There is a join interval between the end of the unicast burst 114 and the start of the multicast stream 116. In this join interval, the client module is attempting to establish a connection to the multicast functionality 112. For example, in an IGMP multicast solution, the join interval may depend, in part, on a delay in router(s) handling the IGMP join request. In a satellite broadcast solution, the join interval may depend, in part, on a time required to switch the client module's tuner (not shown) to a new transponder (to receive the broadcast). Still other solutions are possible, each having its own respective "join behavior."

There are different events that can be used to demarcate this join interval. In one case, the server module continues to transmit at the burst rate up until the time it issues a request for the client module to switch over to the multicast stream 116. In another case, the server module can continue to transmit at the burst rate beyond this point up until the minimum time period in which the client module can successfully satisfy the server module's request that it join the multicast stream 116. The second scenario will shorten the length of the join interval. In any event, the general goal in the rate-limited environment is to prevent two full-rate streams from being received simultaneously, because this may exceed the $(1+E)*$Nominal capacity threshold (where E is understood as being less than 1 in this exemplary and non-limiting example).

Another issue that this disclosure addresses at length (below) is what activity can occur in the join interval. In a first scenario, the server module that is servicing the client module sends no resource information to the client module in this join interval. This would mean that the below-nominal rate is 0. In another case, the server module transmits resource information taken from unicast stream 114 at a below-nominal rate. In one particular case, the server module sends the client module resource information at the rate of E*Nominal. The value of E can be fixed in advance. Or, in the event that the server module (and/or client module) is continually monitoring the available excess capacity of the communication channel, then the excess capacity can fluctuate depending on the time-varying excess capacity (as will be described in Section C). Generally, it is useful to send at least some data from the unicast stream 114 during the join interval because this allows the client module's buffer to receive at least some resource information in what would otherwise be a "dead" period.

However, regardless of what the server module does during the join interval, the client module will generally miss some of the packets that would have been transmitted during this interval (that is, if there was no break in the full-rate transmission). Stated another way, there will be holes in the received information caused by the join interval. Without corrective measures, the client module's output will suffer degradation if the client module consumes the resource information containing the holes. Such degradation could manifest itself in various artifacts, or possibly the complete failure of the presentation (e.g., where the system 100 effectively drops the stream).

According to the novel technique employed herein, the client module can overcome the problems that would be caused by the holes by sending retry requests to the server module. These retry requests ask the server module to supply any packets that the client module has identified as missing. The client module can identify missing packets by ordering the received packets according to their sequence numbers. A discontinuity in the sequence numbers suggests that a packet has been lost (or, if corrupted, effectively lost). However, with some transports (such as UDP) because the client module can expect to receive packets out of order (upon which it reassembles them into the proper order), it may assess a loss of packets only when the packets are not received within a prescribed amount of time. In any event, the client module can make its retry requests in one or more submissions to the server module. The client module can make these requests after the join interval, when the multicast stream 116 is already being received. The server module then responds by supplying the missing packets requested by the client module. Again, the server module supplies the missing packets simultaneously with the presentation of the multicast stream. So as not to exceed the overall limitations on data rate, the server module will supply the retry packets at a rate that, when combined with the actual or nominal bandwidth requirements of the multicast stream, does not exceed the (1+E)*Nominal threshold requirements. The effect of receiving the retry packets after the join interval is to supply the client module with any missing information before this missing information negatively impacts the performance of the client module. In other words, the retry packets fill in the holes in the received stream before these holes are consumed by the client module's decoder.

The above features describe the run-time behavior of the rate-limited ACC strategy. Another aspect of the strategy pertains to the manner in which the system 100 is configured in order to successfully achieve the above-described rate-limited ACC streaming behavior. Namely, a number of different parameters govern the behavior of the rate-limited streaming. Exemplary such parameters include:

The amount of fractional excess capacity E that is to be employed;

The amount of excess resource information that the server module needs to forward to the client module in order to accommodate the rate-limited ACC strategy, and the amount of time required to transmit this excess resource information (e.g., the length of the unicast burst);

The amount of buffer that the server module needs to allocate for storing the excess resource information;

The amount of buffer than the client module needs to allocate to store the excess resource information (and a determination of whether it has such capacity);

The type of unicast transmission that is permitted during the join interval (including receiving no unicast transmission or receiving unicast transmission at the fractional excess rate of E);

The length of time associated with the join interval (which generally corresponds to the technology-specific time required to make a multicast connection);

Various features regarding the characteristics of the retry behavior that takes place after the join interval;

The selection of one parameter generally impacts other parameters. The general goal in configuring the system 100 is to select a combination of such parameters that yields the desired rate-limited ACC behavior.

One exemplary configuration tool allows a designer to define various combinations of parameters that will provide desired rate-limited ACC behavior by ensuring that the ratio ($T_{burst}/T_{join}$) is related to some function of the fractional excess capacity E in a defined way, where $T_{burst}$ describes the length of time of the unicast burst, and $T_{join}$ describes the amount of time required to join the multicast stream 116. Calculation of this nature can be performed by any of the "actors" within the system 100, such as any of the server modules 110 and/or any of the client modules 106.

Alternatively, the system 100 may employ a separate configuration tool 118 to make any of the computations described herein. The configuration tool 118 can comprise a computer device, which can be either a stationary or portable computer device. Further, the computer device 118 can be either a stand-alone or networked computer device. The configuration tool 118 can rely on a human operator to manually input relevant parameters, or can automatically extract relevant parameters from the system 100. Finally, the system 100 can rely on a human operator to implement the recommendations of the configuration tool. Or the configuration tool 118 can automatically supply its recommendations to the relevant actors in the system 100, and these actors can automatically reconfigure themselves based on the recommendations.

As a conclusion to this subsection, it can be seen that the rate-limited ACC strategy described above achieves the benefits of rapidly supplying the client modules 106 with resource information upon channel change events, to thereby improve user experience (by not subjecting the user to annoying delays when he or she changes channels). At the same time, the rate-limited ACC strategy does not demand that the system 100 devote large bandwidth capacity to accommodate this feature. Stated in another way, the system eliminates the need to provide a bandwidth that can accommodate the concurrent presentation of two full-rate streams (e.g., a full-rate unicast stream at the same time as a full-rate multicast stream). Instead, the strategy staggers the burst-rate unicast stream 114 and the multicast steam 116 in series, with a join interval in between; any packets that are missed due to this join interval can be filled in by retry requests, where the retry activity takes place concurrently with the presentation of the stream and reception of the multicast stream (because the multicast stream 116 takes place at or below the nominal rate, allowing some excess capacity for retry activity). The system is therefore suitable for those environments where there are significant constraints on bandwidth due to any number of technical and/or business-related reasons.

The following sections provide more details on the topics introduced above.

A.2. Exemplary Server Module and Client Module for Rate-Limited ACC

Figure 2:
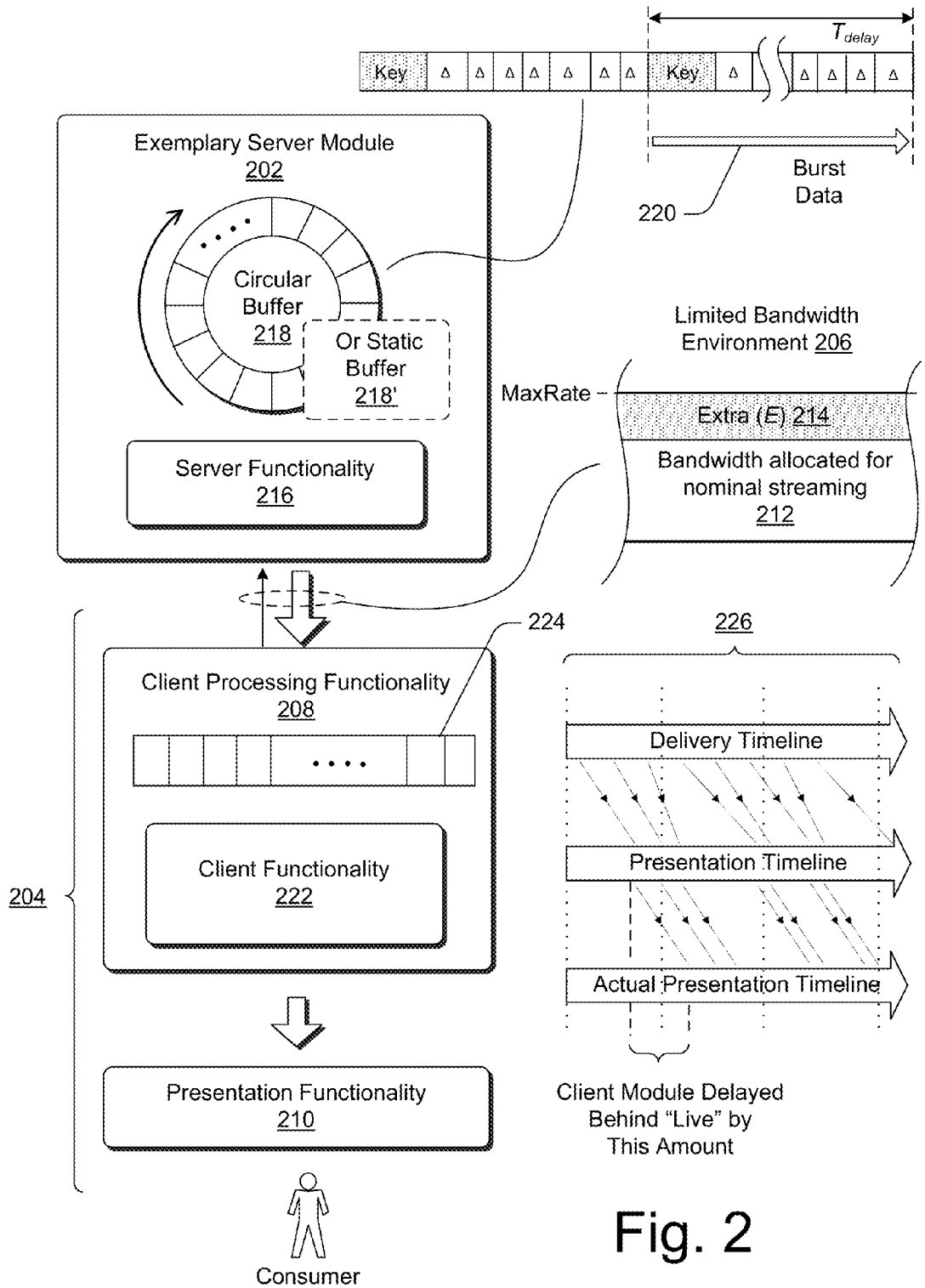
FIG. 2 shows an exemplary server module and client module used in the system of FIG. 2.
Figure 3:
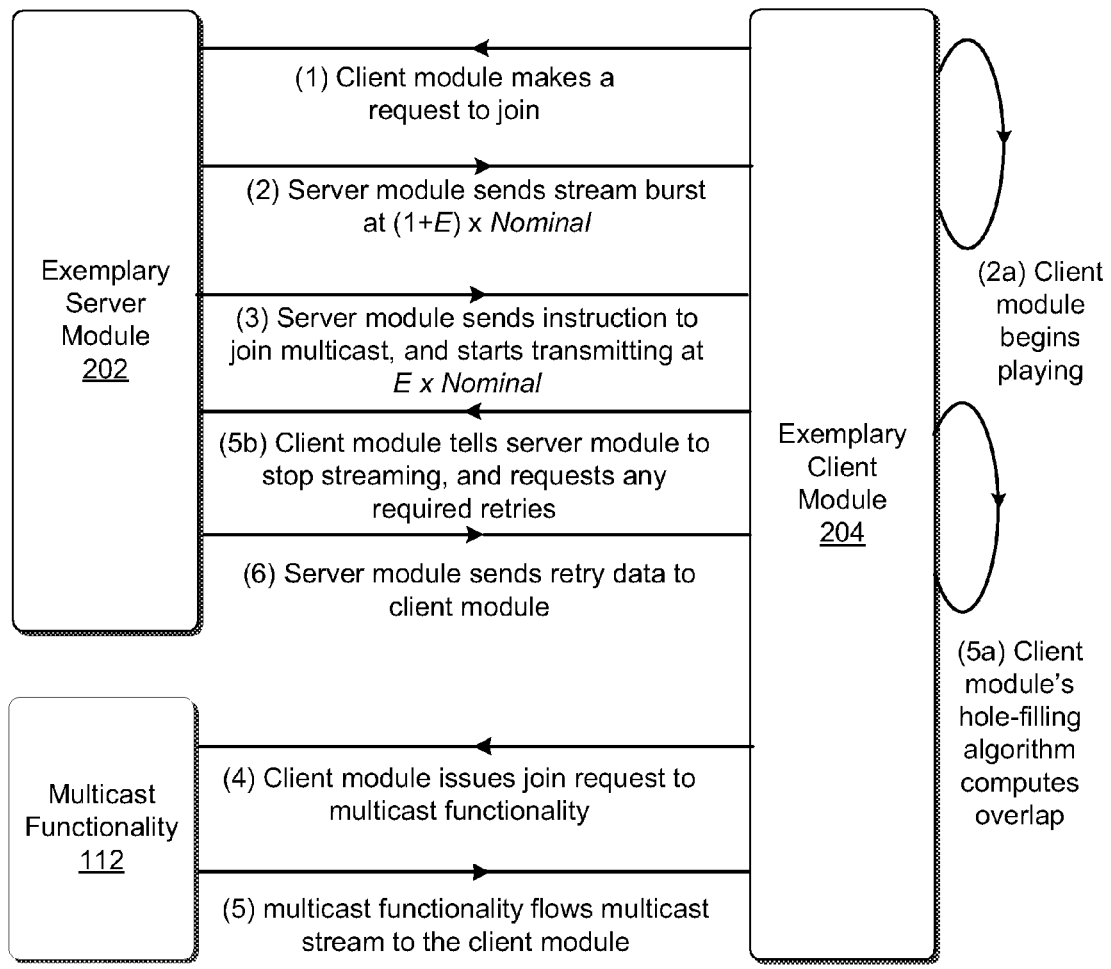
FIG. 3 shows an exemplary sequence of information flowing between the server module and the client module of FIG. 3 in the course of performing the rate-limited ACC paradigm.

FIG. 2 describes the rate-limited ACC functionality on a next level of detail by showing more information regarding any of the exemplary server modules 106 and client modules 110 that appear in FIG. 1. Namely, FIG. 2 shows an exemplary server module 202 which interacts with an exemplary client module 204 via a communication channel 206 to deliver resource information. Again, the case of a constant bit rate or worst-case capped VBR is assumed, although, as will be described in Section C, the principles described herein can be extended to other environments.

The server module 202 can be implemented as any kind of computer device with hardware and/or software that enables it to function in the role of a supplier of services to client modules. As a computer device, the server module 202 can include any array of conventional hardware (not shown), such as one or more processor devices (CPUs), RAM memory, ROM memory, various media drives and associated media (e.g., hard drives and associated hard disc), various buses to couple the components together, various communication interfaces, various input/output functionality, and so forth.

The client module 204 can include any kind of equipment for interacting with the server module 202 (and for interacting with the multicast functionality 112). In one exemplary case, the client module 204 can correspond to set-top boxes, game-type consoles (such as Microsoft Corporation's Xbox™ game consoles), software and/or hardware functionality integrated into the associated presentation devices, general purpose or special purpose computer devices, and so forth. In any case, the client module 204 can include at least the basic hardware identified above with respect to server module 202, as well as any additional hardware specifically targeted to its role as a consumer (rather than supplier) of resource information.

FIG. 2 shows that the client module 204 comprises processing functionality 208 for processing resource information received from the server module 202, as well as presentation functionality 210 that outputs the processed resource information to a consumer. For instance, the client processing functionality 208 can correspond to a set-top box, and the presentation functionality 210 can correspond to a television unit which couples to the set-top box. Or the client processing functionality 208 can correspond to a general purpose computer and the presentation functionality 210 can correspond to a computer monitor which couples to the computer.

FIG. 2 illustrates the rate-limited channel 206 by showing a bandwidth 212 that is allocated to steady-state "normal" streaming of the resource information at a nominal peak rate, and an excess bandwidth 214 which is added to the nominal bandwidth 212. The extra bandwidth 214 can be expressed as a bit rate or as a fractional value E. The channel 206 is rate-limited in the sense that the instantaneous data rate should not exceed the ceiling threshold defined by the aggregate of the nominal bandwidth 212 and the extra bandwidth 214, that is, in aggregate, (1+E) of the nominal bandwidth.

An example will make these concepts more concrete. Consider the illustrative case where a client module is allowed to use two one megabit streams and two 100 kilobit streams simultaneously. Assume further that the system that supplies these streams is provisioned with three megabits to implement the communication channel, which leaves 0.8 megabits free on the channel. This yields an excess percentage amount of 0.8/2.2 or 0.36. This fractional rate limitation can be applied to each component stream supported by the communication channel. That is, each one megabit stream can use 0.36 megabits and each 100 kilobit stream can use 36 kilobits extra without the risk of any of these streams interfering with each other. It is therefore seen that the rate restrictions can be parsed out in fractional fashion to apply individually to component streams supplied to a single client module (or supplied to multiple client modules which feed off of the same communication channel). However, to simplify the discussion, it will generally be assumed that the rate restrictions apply to the case where a single client module is presenting a single stream of resource information.

Additional information will next be provided regarding the composition of the server module 202. Namely, the server module 202 includes server functionality 216 which enables server module 202 to function in the manner described herein. In part, the server functionality 216 includes: logic (hardware and/or software) for receiving resource information from the acquisition functionality 104 (or elsewhere); logic for supplying a burst of unicast resource information to a client module 204 in response to a channel change event; logic for optionally transmitting a below-nominal rate unicast stream to the client module 204 during the join interval (when the client module is switching from unicast delivery to multicast delivery); logic for receiving requests from the client module 204 to supply missing packets, and so forth. To function in this manner, the server module 202 maintains a buffer 218. For the case of the delivery of live resource information streamed from the acquisition functionality 104, the buffer 218 can comprise a sliding circular buffer. The buffer 218 stores recently received resource information (from the acquisition functionality 104), including the resource information that will populate: the initial unicast burst; the below-nominal unicast transmission during the join interval; and the information that will be used to satisfy the client module 204's retry requests (if possible). Generally speaking, the buffer 218 comprises a FIFO-type buffer; it stores new resource information that is supplied by the acquisition functionality 104 by generally deleting the oldest resource information within the buffer 218. The server module 202 can also function as a forwarder of information that it stores in advance. Namely, instead of streaming in live media information from the acquisition functionality 104, the server module 202 can stream video on demand (VOD) information that it stores in its memory. FIG. 1 represents this scenario by the bubble labeled "VOD Source" associated with the topmost exemplary server module. In this scenario, the server module 202 can employ a static buffer 218' to delivery the VOD assets, rather than the sliding circular buffer 218 shown in FIG. 2. Section C provides additional information regarding the delivery of VOD assets.

During the initial burst at the (1+E)*Nominal data rate, the server module 202 will send the burst for a prescribed amount of time, referred to as $T_{burst}$. This means that the server module 202 will reach back to pull an appropriate amount of resource information from the buffer 218 to compose the burst having the duration $T_{burst}$. FIG. 2 illustrates a segment of resource information 220 that is presented in the exemplary unicast burst. This segments may generally correspond to resource information that was received by the acquisition functionality 104 about 10 seconds prior to current time. The minimum amount of excess buffer that the server module must maintain is equal to $T_{delay}$*Nominal (which is the same as $E*T_{burst}$*Nominal).

The resource information sent by the server module 202 can be expressed in various formats. In one implementation, the resource information comprises video information. The video information is composed of a series of key frames (also referred to as I frames, random access points, etc.) which contain complete video frames that are independently decodable and don't depend on previous resource information in order to decode to a complete video frame that can be displayed to the user. The video information can also include a variety of difference frames (Δ) which represent a video frame for different times by expressing how the video information differs from one or more other frames. MPEG-2, for example, uses this approach by presenting a combination of I-frames, B frames and P frames (where the I frames constitute key frames and the B and P frames constitute difference frames). In this technology, as described above, the server module 202 will select the segment of resource information to be sent to the client module 204 in the burst so that it begins at a key frame. This is beneficial because the client module 204 cannot begin rendering resource information until it receives a key frame. By forcing the server module 202 to start its transmission with a key frame, the client module 204 will not have to receive a series of difference frames before receiving a key frame. (Note that, while FIG. 2 and the other figures represent the resource information as a series of frames to facilitate discussion, it is important to note that the server module 202 will break this information up into a series of packets and transmit the information to the client module 204 in units of packets, not frames.)

Now turning to the composition of the client module 204, this module 204 includes client functionality 222 which enables the client module 204 to function in the manner described herein. In part, the client functionality 222 includes: logic (hardware and/or software) for establishing a connection with the server module 202 as well as the multicast functionality 112; logic for receiving and rendering the unicast stream 114 and the multicast stream 116; and logic for sending retry requests to the server module 202. To function in this manner, the client module 204 maintains a client buffer 224 (if so equipped). The client buffer 224 stores a prescribed amount of resource information received from the server module 202. The client functionality 222 draws from the client buffer 224 when it presents the resource information. The maximum amount of extra buffer required is $T_{delay}$*Nominal. In other words, the client module 204 should be pre-provisioned with a buffer that can store $T_{delay}$*Nominal amount of information (which is the same as $E*T_{burst}$*Nominal).

The client module 204 can communicate its capabilities to the server module 202 on its own initiative, or when queried by the server module 202. If the server module 202 determines that the client module 204 has insufficient buffer capacity, it can refrain from using the rate-limited ACC technique when communicating with the client module 204, or can use another kind of accelerated start technique that the client module 204 can accommodate.

In operation, in one mode, the client module 208 can immediately start playing resource information upon receipt of the resource information (e.g., without requiring any preliminary buffering). This solution may result in some unsteady performance when first tuning to a channel. In another mode, the client module 208 can require that a prescribed amount of information be buffered prior to the presentation of the video information. This will result in a short presentation delay, but such a delay is reduced by virtue of the use of the ACC initial burst. In still another mode, the client module 208 can display the initial key frame as soon as it is received, then buffer a prescribed amount before beginning full-motion playback.

Finally, FIG. 2 shows a series of timelines 226 that illustrate the manner in which the client module 204 consumes resource information. Consider the case of video information. Many protocols tag video information using two separate time stamps: a delivery timestamp and a presentation timestamp. A delivery timestamp associated with a packet describes when that packet is intended to be delivered to a receiver. The presentation timestamp describes when the decoded version of that packet should actually end up on the presentation functionality 210 (e.g., a television screen). The maximum gap permitted between the delivery and presentation timestamps is a configurable parameter of an encoder, referred to as the "max PCR/PTS delay."

A series of delivery timestamps defines a delivery timeline. The first timeline in the group of timelines 226 shows a delivery timeline. A series of presentation timestamps defines a presentation timeline. The second timeline in the group of timelines 226 shows a presentation timeline. The arrows connecting the delivery timeline and the presentation timeline illustrate how packets in the delivery timeline correspond to the same packets in the presentation timeline. The arrows are skewed because the packets are intended to be presented some time after their respective delivery times. FIG. 2 also shows that the packets are evenly spaced on the delivery timeline, but are bunched up on the presentation timeline. This is because video information is delivered at a constant rate (the nominal rate of the stream) in this exemplary and non-limiting case (and therefore satisfies the worst-case for the steady-state stream bandwidth), but the video information is not consumed at a constant rate (e.g., the key frames are much larger than the difference frames, but are presented on a display for the same amount of time).

The group of timelines 226 also shows a third timeline that describes when the packets are actually presented (as opposed to when they were intended to be presented). The arrows connecting the presentation timeline and the actual timeline illustrate how packets in the presentation timeline correspond to the same packets in the actual timeline. The arrows are skewed because the packets are actually presented some time after they were intended to be presented. Namely, the large buffer 224 used by the client module 204 imposes a delay in the presentation of the video information (because there will typically be some amount of time between when the packet is placed in the buffer 224 and when it is actually output to the presentation functionality 210). Different client modules may have different mechanisms (e.g., buffer capacities) for delaying the presentation of the video information; hence, different client modules may follow different respective actual presentation timelines. Other reasons that the client modules may have different actual presentation timelines include: (a) client modules tuning to the stream at slightly different times; and (b) client modules requiring different amounts of delay relative to a live state for smooth playback, depending on the loss rate of the channel; and (c) client modules requiring different amounts of delay relative to a live state for smooth playback, depending on the delivery time jitter of the channel.

Consider the following example to illustrate the presentation of video information for two client modules that request the same program from the server module 202. If the client modules make the request about one second part from each other, then the server module 202 might start bursting data to both client modules starting from the same key frame. If network conditions are similar for the two client modules, the client module which connected to the server module 202 earlier in time would have an actual presentation timeline exactly one second before the second client module to connect. As long as those two client modules remain connected to the program, they will remain one second apart in actual display time.

In some broadcast systems the delivery timestamp serves as an authoritative clock reference. One exemplary implementation of the present system, however, uses a shared clock to control playback of the video information. For example, the system can use a Network Time Protocol (NTP) clock reference as the shared clock. In operation, the client module 204 determines the offset between the presentation timestamp information in the video stream and the shared clock, and then attempts to maintain this offset throughout the reception of the video information.

In the present system, the delivery timestamp also serves as floor threshold when performing the rate-limited ACC technique. Namely, as will be explored in detail below, the rate-limited ACC technique will attempt to feed video information to the client module 204 in such a way that the client module 204 never falls behind on the delivery timeline (as shown in the first timeline of the group 226 of FIG. 2).

A.3. Exemplary Interaction between the Server Module and the Client Module

Figure 5:
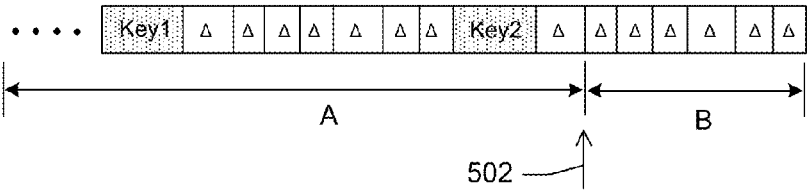
FIG. 5 shows a stream of media information presented at three different junctures of the communication channel representation of FIG. 6.
Figure 5:
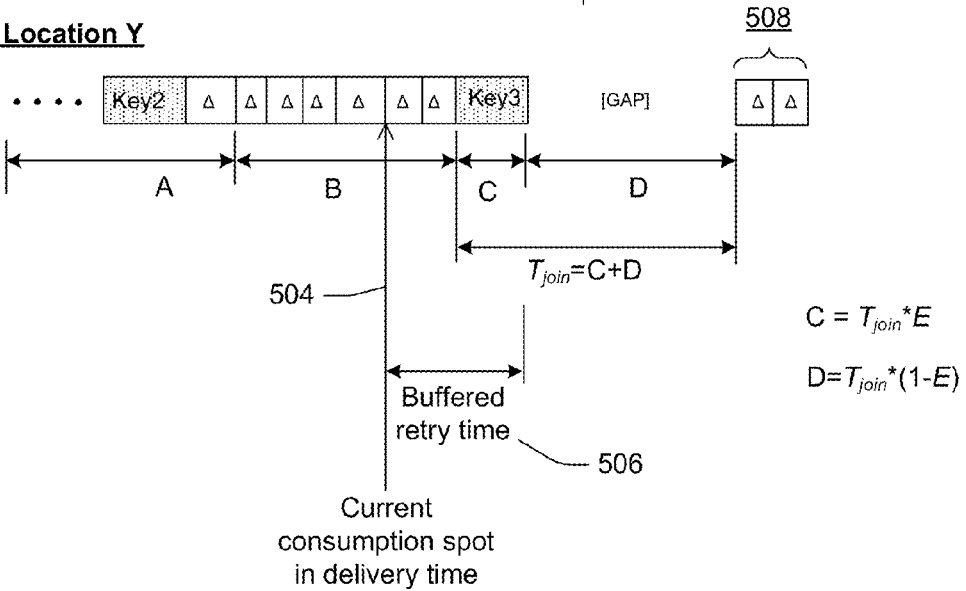
Figure 5:
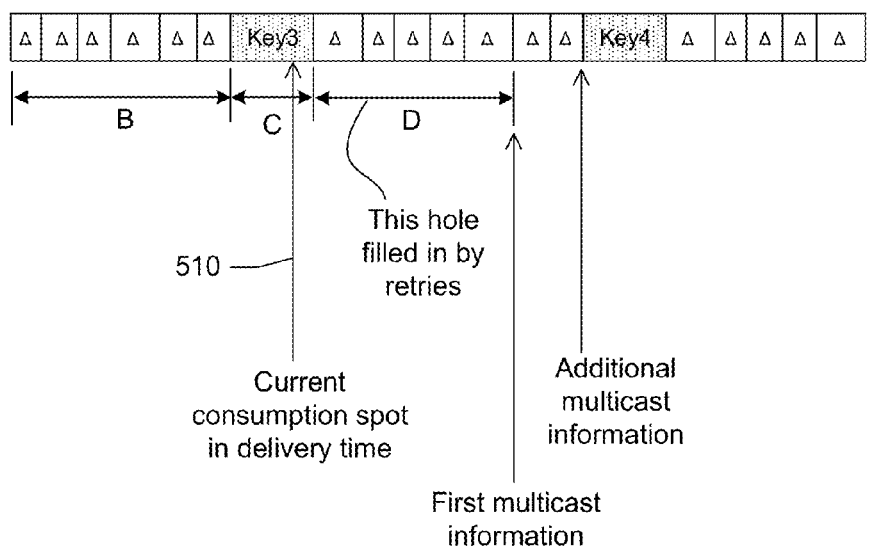

FIG. 5 is an exemplary series of operations that explain the interaction between the exemplary client module 204 (introduced in FIG. 2) and, on one hand, the exemplary server module 202 (introduced in FIG. 2), and, on the other hand, the multicast functionality 112 (introduced in FIG. 1). The order and nature of the operations are exemplary. Other implementations of the rate-limited ACC strategy can apply the operations in somewhat different order, and/or can include additional types of operations, and/or can omit one or more operations shown in FIG. 5.

To begin with, in operation (1), when the client module 204 initiates the presentation of a stream of resource information, it sends a request to the server module 202. The head-end functionality 102 may assign the client module 204 to one of its server modules 110 using any kind of assignment algorithm (such as a fixed assignment, a load-balancing assignment, and so forth). Operation (1) may generally correspond to an event in which a user changes channels to receive a new program, or otherwise performs any act which prompts the client module 240 to request connection to a new program (or a new part of a same program, such as in response to a fast-forward command, etc.).

In operation (2), the server module 202 responds by setting up a unicast to the client module 204. A unicast involves a one-to-one allocation of prescribed server resources to the client module 204. The server module 202 then initiates the stream by first sending an initial burst of the resource information at a rate of (1+E)*Nominal, where Nominal defines the nominal rate of the stream, and E defines some prescribed fractional amount over the nominal rate (such as approximately 20 percent). This transmission defines the start of the unicast stream 114 introduced in FIG. 1.

Moreover, in operation (1), the client module 204 can optionally inform the server module 202 of its buffer capacity. The client module 204 might not have any extra buffer, or may have only a limited amount of extra buffer. If the server module 202 determines that the client module 204 cannot accommodate the rate-limited ACC technique described herein, it will not send the burst in operation (2). It may simply forward the resource information at the nominal rate (which will incur a delay before the resource information can be presented), or it will use some other ACC technique that makes fewer demands on the buffer capacity of the client module 204.

Presuming that the client module 204 does have the requisite buffer capacity, then, for the case of live delivery of resource information, the server module 202 sends a unicast burst that is offset by a delay time of $T_{delay}$ in presentation timeline terms. This burst is also configured to start at a key frame.

Similar provisions apply to the delivery of pre-stored VOD assets. More specifically, in the VOD case, it is generally possible to perform the burst by starting from a point that is as "far back" as desired in the stream, since all the resource information is available for distribution at the server module 202. But the client module 204's buffer has a limited capacity, and there is limited need for buffering based on the characteristics of the network. In view of these factors, one exemplary strategy (for VOD) is to provide a burst having a duration ($T_{delay}$/E) that is sufficient to allow enough time for retries to be requested and sent well before the resource information is needed, even if the same packet is missed, for example, one or two times. In extremely lossy networks, it may be desirable to allow for enough time to attempt retry more than twice. In order to do this, $T_{delay}$ can be made larger, which makes the burst last longer.

As indicated by operation 2(a), the client module 204 begins presenting the resource information a short time after receiving the start of the initial burst. This time is brief enough so that the user will not perceive an unacceptable delay in presentation upon changing channels.

In operation (3), at the tail end of the unicast burst, the server module sends a command to the client module 204 to join the multicast stream 116.

In operation (4), the client module 204 responds to the request of the server module 202 by making its own request to the multicast functionality 112 to set up the multicast stream 116. As described above, this may constitute issuing an IGMP join command. This command will prompt the multicast functionality 112 to connect the client module 204 to an appropriate node in which it can receive an ongoing multicast transmission. As described above, in one case, the server modules 110 themselves may receive the resource information using a multicast distribution scheme from the ultimate source defined by the acquisition functionality 104. The join operation in this case would entail connecting the client module 204 to this same ongoing multicast stream 116.

Assume that the multicast join is successful and the client module 204 successfully connects to the multicast stream 116. In operation (5), the multicast functionality 112 forwards its first multicast packet to the client module 204. The ensuing multicast stream is received at a data rate that is less than or equal to the nominal data rate.

As described in a preceding subsection, there will be a time lag between the last unicast packet received and the first multicast packet that is received, referred to herein as the join interval. In one case, the server module 202 sends no unicast information in the join interval. In another case (which is the case of FIG. 5), at the start of operation (3), the server module 202 starts sending the unicast stream at a rate of E*Nominal. In any event, the failure to send streaming information at the full (nominal) data rate will have the effect of creating "holes" in the resource information received in the client module 204's buffer 224. These holes define packets that have been lost, because they never were received or have been received but are corrupted. These holes will lead to degradation of the output presentation if they are not filled in by the time the client module 204 decodes this resource information.

As such, in operation (5a), the client module 204 determines what holes are present in the received resource information. It can do this by ordering the received packets according to their sequence numbers and then noting any discontinuities in the sequence numbers; the discontinuities define holes.

In operation (5b), the client module 204 sends a command to the server module 202 that requests the server module 202 to send the missing packets. The client module 204 can send multiple commands for each respective missing packet or can send commands that each identify several of the missing packets.

After receipt of the retry request(s), the server module 202 prepares the missing packets for transmission to the client module 204 (if it can). The server module 202 performs this task by pulling the missing packets from its buffer 216 (if they are still present). In operation (6), the server module 202 sends the missing packets to the client module 204. As will be apparent in the discussion of the next figure, the server module 202 sends the retry information as a normal stream of packets at a data rate of E*Nominal, concurrently with the receipt of the multicast stream at or below the nominal data rate, such that the total bandwidth is again (1+E)*Nominal. The retry packets are "normal packets" in the sense that they are not specifically earmarked as retry packets. The client module 204 can identify retry packets because it has requested them; they are identified upon receipt by their sequence numbers. Section C describes variations on this protocol, in which the server module 202 can take advantage of dips in the data rate of the multicast stream by sending additional retry information (such that the server module 202 sends information at a rate of MaxRate−ActualCurrentMulticastRate, which can be expressed also as E*Nominal+(Nominal−ActualCurrentMulticastRate)).

Figure 4:
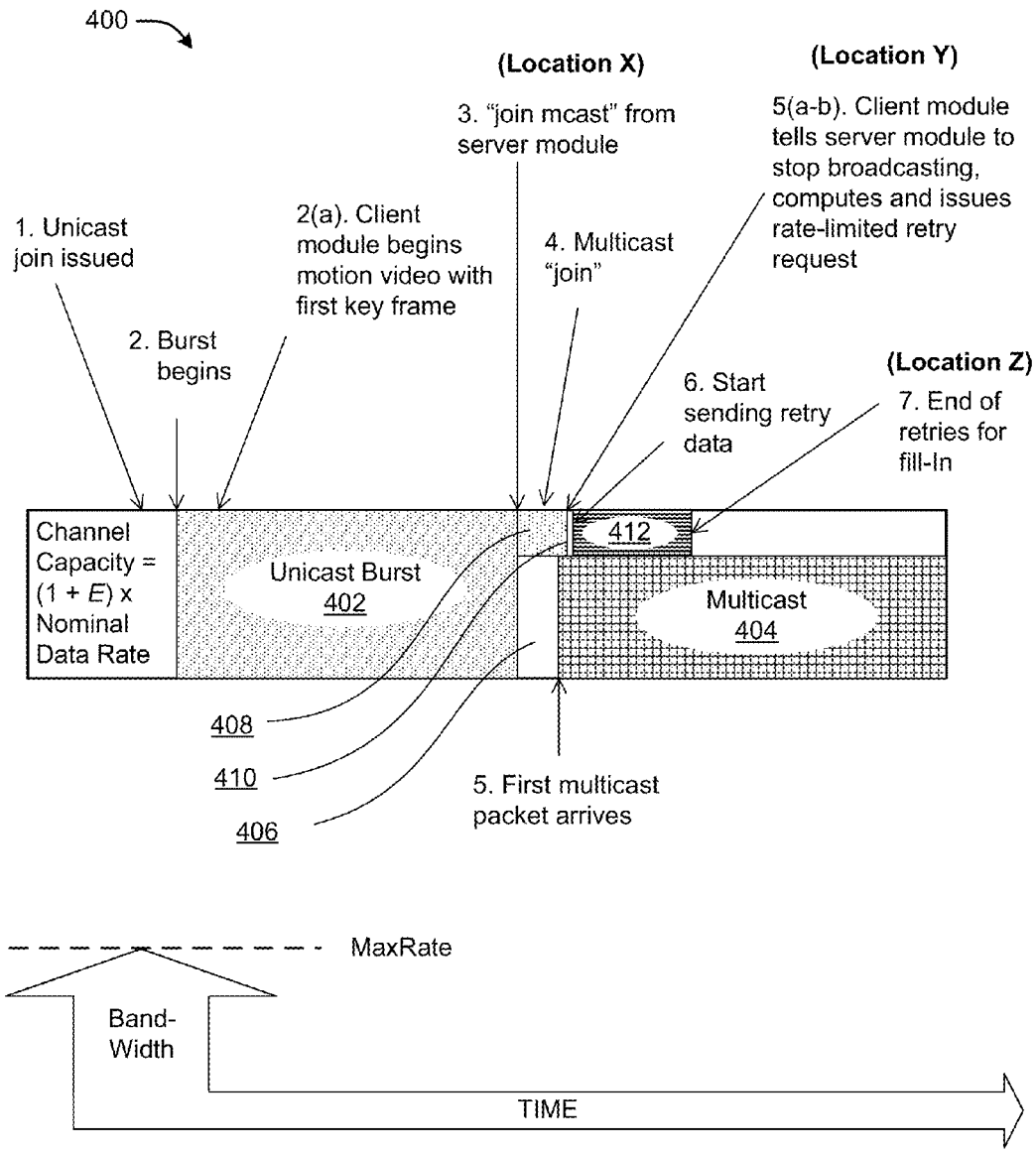
FIG. 4 shows a representation of a communication channel that couples the server module and the client module of FIG. 3, which illustrates the amount of bandwidth consumed by the rate-limited ACC strategy as a function of time.

FIG. 4 shows a bandwidth-vs.-time depiction 400 that illustrates how the operations described in FIG. 5 correspond to different utilizations of bandwidth at different times. Namely, the horizontal axis of this depiction 400 corresponds to time. The vertical dimension any of the rectangles shown in the depiction 400 corresponds to the amount of bandwidth that is being consumed. The largest encompassing rectangle has a vertical height corresponding to the maximum bit rate permitted by the rate-limited environment, namely (1+E)*Nominal. As a preliminary matter, it should be noted that the dimensions of the other rectangles shown within the larger rectangle may not be drawn to scale; namely, the dimensions of some of the rectangles may be expanded or compressed to facilitate illustration and discussion. Further, again note that the simplifying case of constant bit rate is assumed (which also applies to the worst-case scenario of capped VBR). Section C describes how this analysis can be extended for other scenarios.

The enumerated operations shown in FIG. 4 correspond to the same numbered operations shown in FIG. 5, thus there is no need to repeat their description in the context of FIG. 4. The focus in FIG. 5 will center on the relative timing of various events, and the amount of information transmitted at different junctures in the streaming operation. Note first that the unicast burst 402 fills up all of the available bandwidth, e.g., (1+E)*Nominal. In contrast, the multicast 404 occurs at or below the nominal rate (Nominal). The rectangle 406 denotes a period of time between the unicast burst 402 and the multicast 404 having a horizontal dimension equal to the join interval $T_{join}$. This defines the period of time that the system 100 is attempting to establish a multicast connection to the multicast functionality 112.

The remaining rectangles shown in FIG. 4 illustrate activity that occurs in the extra bandwidth region (E). A first optional rectangle 408 corresponds to a unicast stream transmitted by the server module 202 at the rate E*Nominal. This stream is optional because the server module 202 can alternatively transmit 0 data in this region. Also, the server may choose to additionally use any portion of Nominal left unused by the multicast. In any event, the "empty" join rectangle 406 will lead to holes in the received stream of resource information. To address these holes, the client module 204 will send retry requests to the server module 202, asking the server module 202 for packets that have been assessed as lost due to the empty join box 406. The small rectangle 410 represents the small amount of bandwidth consumed by the request operation itself. The following retry rectangle 412 corresponds to the resultant the flow of unicast retry information from the server module 202 to the client module 204. That is, the retry information contains the missing packets requested by the client module 204, transmitted at the rate of E*Nominal (for the case of constant data rate). The area of the rectangle 412 is equal to or approximated by the area of rectangle 406 minus the area of rectangle 408. More intuitively stated, this means that the length of the join interval and the amount of data that is sent in the join interval determine the area of rectangle 412. If no unicast information is transmitted during the join interval, then rectangle 412 will have a correspondingly greater area.

Again, the notable benefit of this technique is that it permits ACC to be performed, thereby quickly supplying a program to user upon switching to it, within an environment that has significant limitations on bandwidth.

FIG. 5 provides yet further information regarding the operation of the system 100. This figure particularly shows the contents of the client module 204's buffer 224 at three junctures, labeled X, Y and Z, which are also identified in FIG. 4. The contents are shown arranged on the presentation timeline, not according to when the contents are received. This figure particularly illustrates the buffer contents in terms of frames because this form of representation is instructive. It should be noted, however, that the buffer 224 will contain packets of information, and that the packets will themselves include parts of the stream of frames. As another simplification, the buffer 224 will typically include more information than is shown in FIG. 5. Moreover, the horizontal time scale of the presentation timeline 224 is appropriately compressed and expanded in FIG. 5 to facilitate illustration and discussion.

At the start of the unicast burst, the client module's buffer 224 is empty. At location X shown in FIG. 4, the buffer 224 has a state shown by the topmost depiction in FIG. 5. Location X corresponds to the juncture at which the entire unicast burst 402 has been sent. Location X also marks the start of the join interval 406. At this juncture, the entire span of the buffer (A+B) corresponds to the amount of resource information that has been received by the burst 402. The vertical line 502 demarcates region A from region B. Region A corresponds to the amount of information that would have been received if the server module 202 had transmitted at the nominal rate, instead of at the excess rate of (1+E)*Nominal. Region B defines the amount of extra information that has been transmitted due to the rate of E*Nominal. Thus, (A+B)/A=E. The line 502 also marks the location where the client module 204 is consuming packets from the perspective of the delivery timeline (again refer to the timelines shown in grouping 226 of FIG. 2).

At location Y shown in FIG. 4, the buffer has a state shown in the middle part of FIG. 5. Location Y corresponds to a juncture at which the unicast transmission at the rate of E*Nominal has just come to an end.

The span of presentation timeline formed by the aggregate of segments C and D corresponds to the join interval ($T_{join}$), namely, the amount of time required to set up the multicast stream 116. The C segment of the presentation timeline represents information the server module 202 sent at the rate of E*Nominal. Thus, the amount of information transmitted in segment C is $T_{join}$*E*Nominal. This segment takes a time of $T_{join}$ to be delivered. FIG. 5 shows that the client module 204 has received a complete key frame during the unicast transmission at the rate of E*Nominal, although this is merely representative.

The segment D marks the amount of information that has been lost due to the failure to transmit at the nominal bit rate during the join interval. The quantity of information lost during the join interval is denoted by $T_{join}$(1−E)*Nominal. The hole defined by segment D has been shown as a continuous block of missing data; but the hole can be comprised of a general span having a mixture of received packets and lost packets. Again, the horizontal span of presentation timeline illustrated in FIG. 5 may not be drawn to proportion.

The vertical line 504 again represents the current point of consumption from the perspective of the delivery timeline. The span of time 506 stretches from the current consumption time 504 to the beginning of the hole (represented by segment D). This segment 506 represents the amount of time that the client module 204 has to fill in the hole. In other words, the client module 204 must fill in the hole before the current consumption time 504 reaches the hole. After the hole, the information 508 denotes the receipt of the first multicast packets from the multicast stream 116.

At location Z shown in FIG. 4, the buffer 224 has a state shown at the bottom part of FIG. 5. Location Z corresponds to a juncture at which the retry packets have all been received in response to a request (or plural requests) by the client module 204. At this juncture, note that the retry information has successfully filled in the hole denoted by span D. Further note that the retry was also successful in the sense that the hole has been filed in before the current point of consumption 510 (from the perspective of the delivery timeline) has reached the start of the hole. Then, after what was once the hole, the client module 204 receives the remainder of the resource information via the multicast stream 116.

A.4. Exemplary Mathematical Analysis and Configuration of the Rate-Limited ACC Streaming Operation As can be appreciated from the previous sections, the behavior of the system 100 shown in FIG. 1 is governed by a combination of several interrelated parameters. Thus, in order for the system 100 to achieve the benefits described above, an appropriate combination of parameters must be selected. The above subsection A.1 enumerated several exemplary parameters that can be taken into account when configuring the system, various combinations of which can achieve the desired retry behavior that has been described.

This section particularly describes mathematical analyses for deriving relationships between the amount of time in the initial burst ($T_{burst}$), the amount of time required by the join interval ($T_{join}$), and the amount of excess capacity E. The relationships define combinations of these variables that will yield the desired retry behavior. More specifically, FIGS. 6-10 describe the computation of such mathematical relationships for different retry-related assumptions. Any functionality can be used to perform the computations described herein, such as the configuration tool 118 introduced in FIG. 1. Again note that the simplifying case of constant bit rate is assumed (which also applies to the worst-case scenario of capped VBR). Section C describes how this analysis can be extended for other scenarios.

Figure 6:
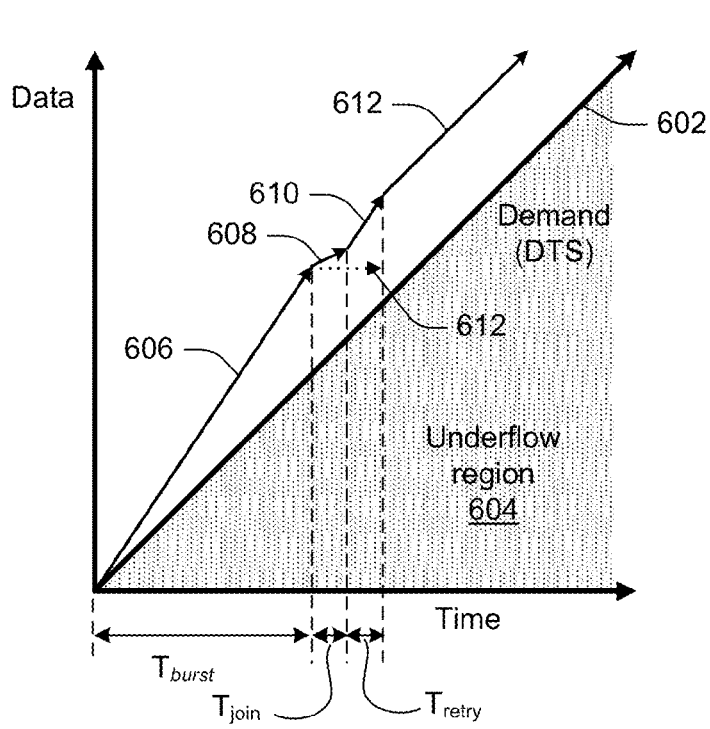
FIGS. 6-8 present different data-versus-time graphs which illustrate the exemplary operation of the rate-limited ACC paradigm in three different modes of operation governed by different retry assumptions.
Figure 6:
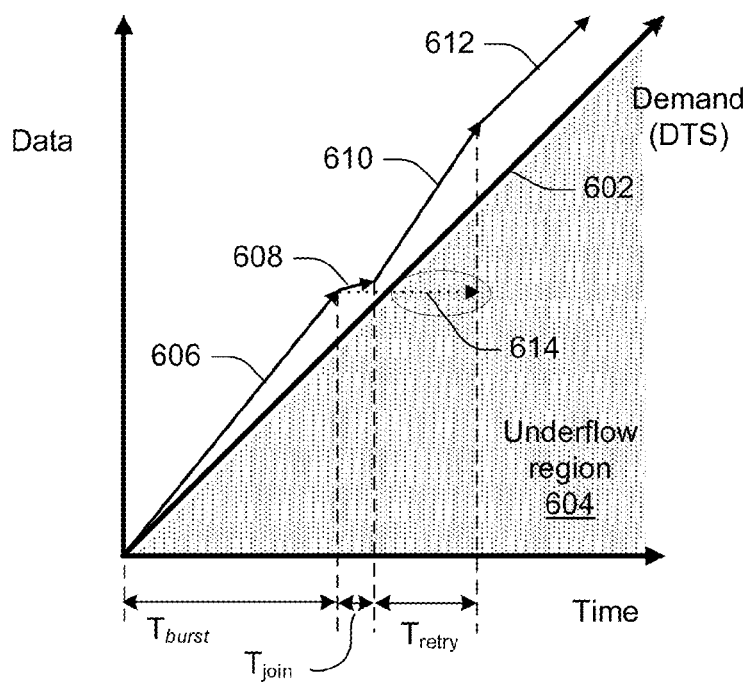

To begin with, FIG. 6 corresponds to the case where the client module 204 demands that it completely fill in the hole of missing packets with retries before the consumption point (from the perspective of the delivery timeline) reaches the end of the information provided by the initial burst alone. Stated in other terms, this condition specifies that the client module 204 must completely fill in region D shown in FIG. 5 before the consumption arrow (e.g. 504) reaches the end of region B. The top graph in FIG. 6 (scenario 1-A) shows a scenario in which the above-defined condition has been reached. The bottom graph in FIG. 6 (scenario 1-B) shows a scenario in which the above-defined condition has not been reached.

Starting with the scenario 1-A, the vertical axis defines an amount of information received by the client module 204, and the horizontal axis defines progressing time. The thick diagonal line 602 describes the client module 204's demand for the resource information. The area beneath the demand curve 602 defines an underflow region 604. This underflow region 604 corresponds to an operational domain in which the client module 204 will experience the insufficient flow of resource information. If the operational state enters this region, the buffer 224 will develop holes that will be consumed by the client module 204's decoder, resulting in degraded performance. (The demand curve is actually assuming the maximum data usage. The actual demand curve, for any particular piece of content, may be lower than this "worst-case" demand curve. But because the described scheme works for the worst-case scenario, it works for all variable bit rate cases of lower demand.)

The first segment 606 of scenario 1-A describes the receipt of resource information during the initial unicast burst at rate (1+E)*Nominal. Note that the slope of segment 606 extends at a steeper angle than the demand curve 602, and thereby progressively extends away from the demand curve 602. This separation equates to desirable extra resource information that client module 204's buffer 224 accumulates during the initial burst, which reaches a maximum amount at the end of the first segment 606.

The second segment 608 graphically describes what happen when the server module 202 transmits at the rate of E*Nominal following the initial burst. This transmission lasts for the length of the join interval $T_{join}$. The server module 202 can optionally transmit 0 amount of information in this period, whereupon the second segment 608 would have a slope of zero.

The third segment 610 graphically describes what happens during the combination of events corresponding to: (a) the receipt of the multicast stream 116 from the multicast functionality 112; and (b) the request for and the receipt of retry information (where the server module 202 sends the retry information in unicast fashion). The aggregate bit rate of this combined activity is (1+E)*Nominal, and therefore has the same slope as the first segment 606.

The last segment 612 graphically describes what happens when the server module 202 finishes sending the retry information, whereupon the client module 204 continues to receive only the multicast stream 116 at the nominal rate.

To repeat, the constraint on the scenarios shown in FIG. 6 is that all of the holes caused by the $T_{join}$ period be filled in before the excess buffer accumulated during the burst period is exhausted. This can be graphically visualized in FIG. 6 by drawing a dotted line 612 with slope=0 from the end of the first line segment 606 to the end of third segment. The end of this dotted line does not enter into the underflow region 604, which means that the stated condition of FIG. 6 has been reached.

Scenario 1-A corresponds to the exemplary and hypothetical case in which E=0.5, $T_{burst}$=6, and $T_{join}$=1. By contrast, scenario 1-B, describes the same conditions, except that the server module 202 transmits at a reduced extra capacity, E=0.25. This decrease in E (in combination with the specified burst time) makes it impossible to establish enough reserve in the client module 204's buffer 224 to meet the stated conditions (that the accumulated extra buffer alone provide enough information so that the client module 204 can completely fill in the gap prior to depletion of the extra buffer).

The graph for scenario 1-B confirms the above conclusion. All of the line segments 606-612 have the same meaning as described above in connection with scenario 1-A, although these segments may trace a different path than the segments shown in scenario 1-A. Of principal note in scenario 1-B is that the dotted line 612 now extends into the underflow region 604, signaling that the stated conditions have not been met.

The constraint identified in FIG. 6 is a particularly conservative one, as information continues to be received during the join interval. This additional information can be used to extend the deadline at which all holes must be filled in.

Figure 7:
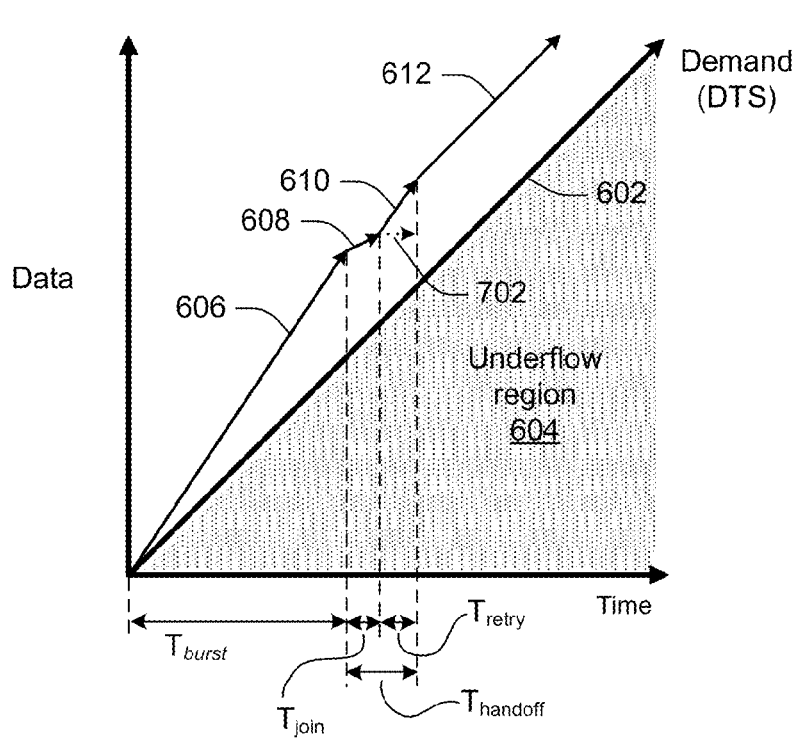
Figure 7:
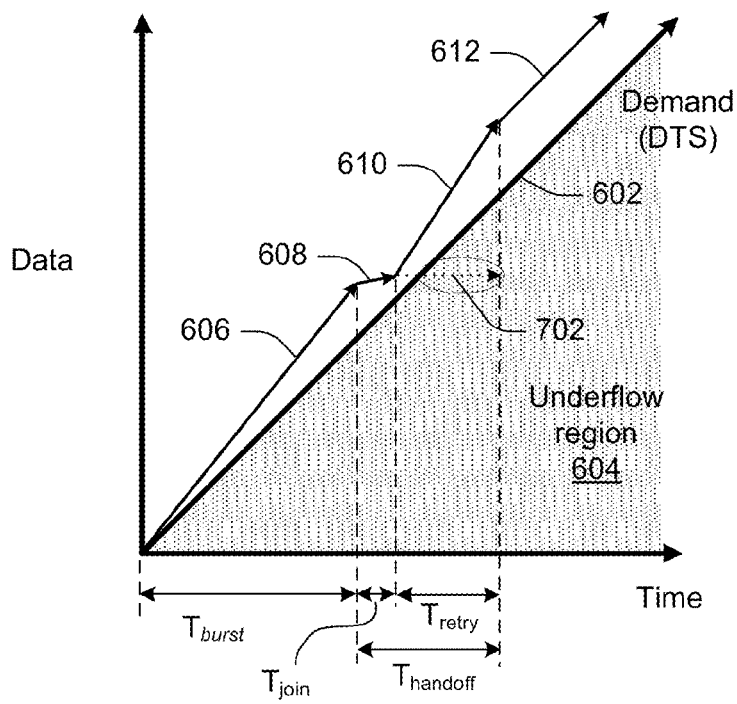

FIG. 7, for instance, presents two scenarios (scenario 2-A and scenario 2-B) that adopt the more liberal constraint that all holes created by the join period be filled in before running out of resource information collected during both: (a) the initial burst period; and (b) the join interval itself. Recall that the server module 202 optionally transmits unicast information at rate E*Nominal during the join interval. In the context of FIG. 5, this constraint means that the client module 204 must fill the gap D before the consumption timeline 504 reaches the end of segment C (because segment C represents the amount of information, $T_{join}$*E*Nominal) that was acquired during the join interval.

The segments shown in scenarios 2-A and 2-B have the same interpretation as the segments described in FIG. 6, and therefore share the same numeric labels. However, now note that the horizontal dotted line, labeled as line 702, starts from the end of the second segment 608. In scenario 2-A (E=0.5), this horizontal dotted line does not cross the demand curve 602 into the underflow region 604. But in scenario 2-B (E=0.25), the dotted horizontal line 702 does extend into the underflow region 604.

Figure 8:
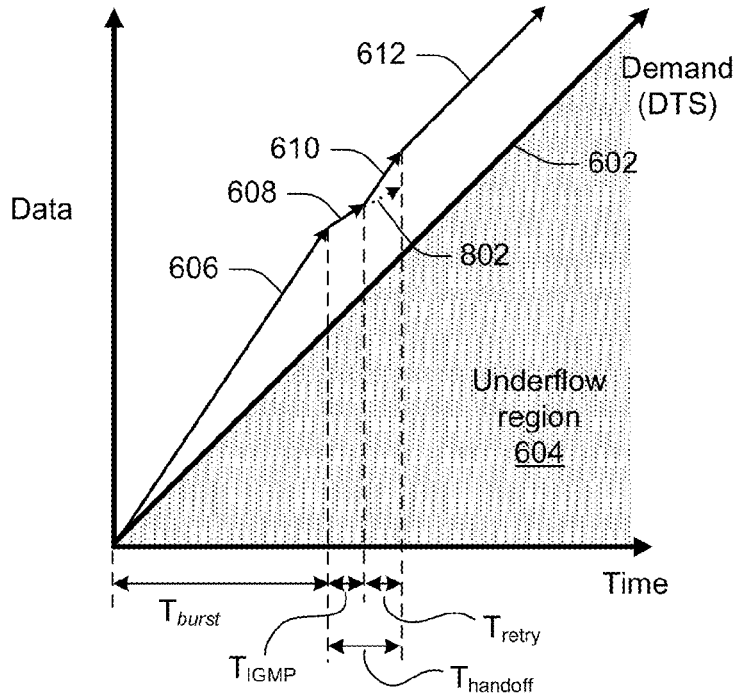
Figure 8:
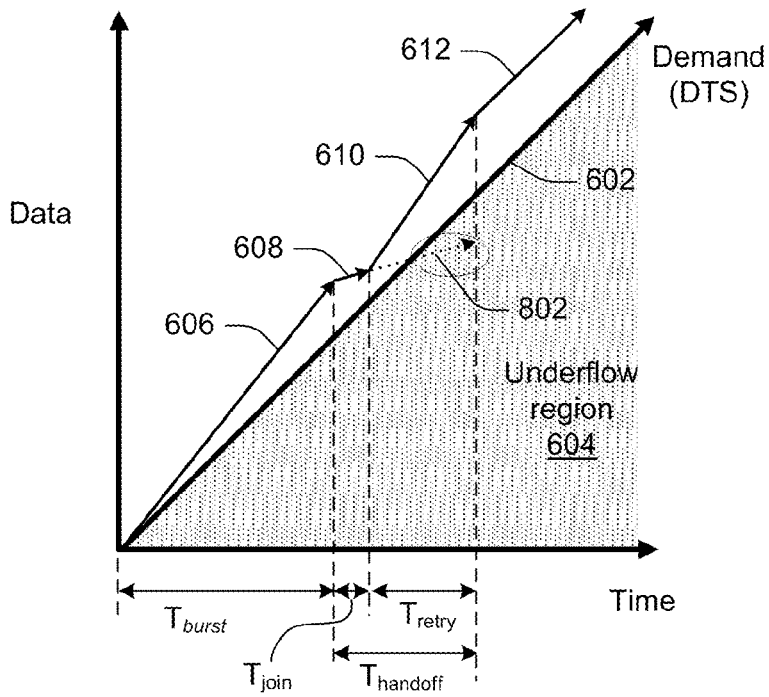

FIG. 8 presents two other scenarios (scenario 3-A and scenario 3-B) that adopt a yet more liberal constraint that stipulates that the current point of consumption must simply not overtake any part of the buffer 224 with holes in it. This more liberal assumption can be satisfied based on resource information received as a result of any of: (a) the initial burst period; (b) the join interval; and (c) retry activity following the join interval.

Figure 10:
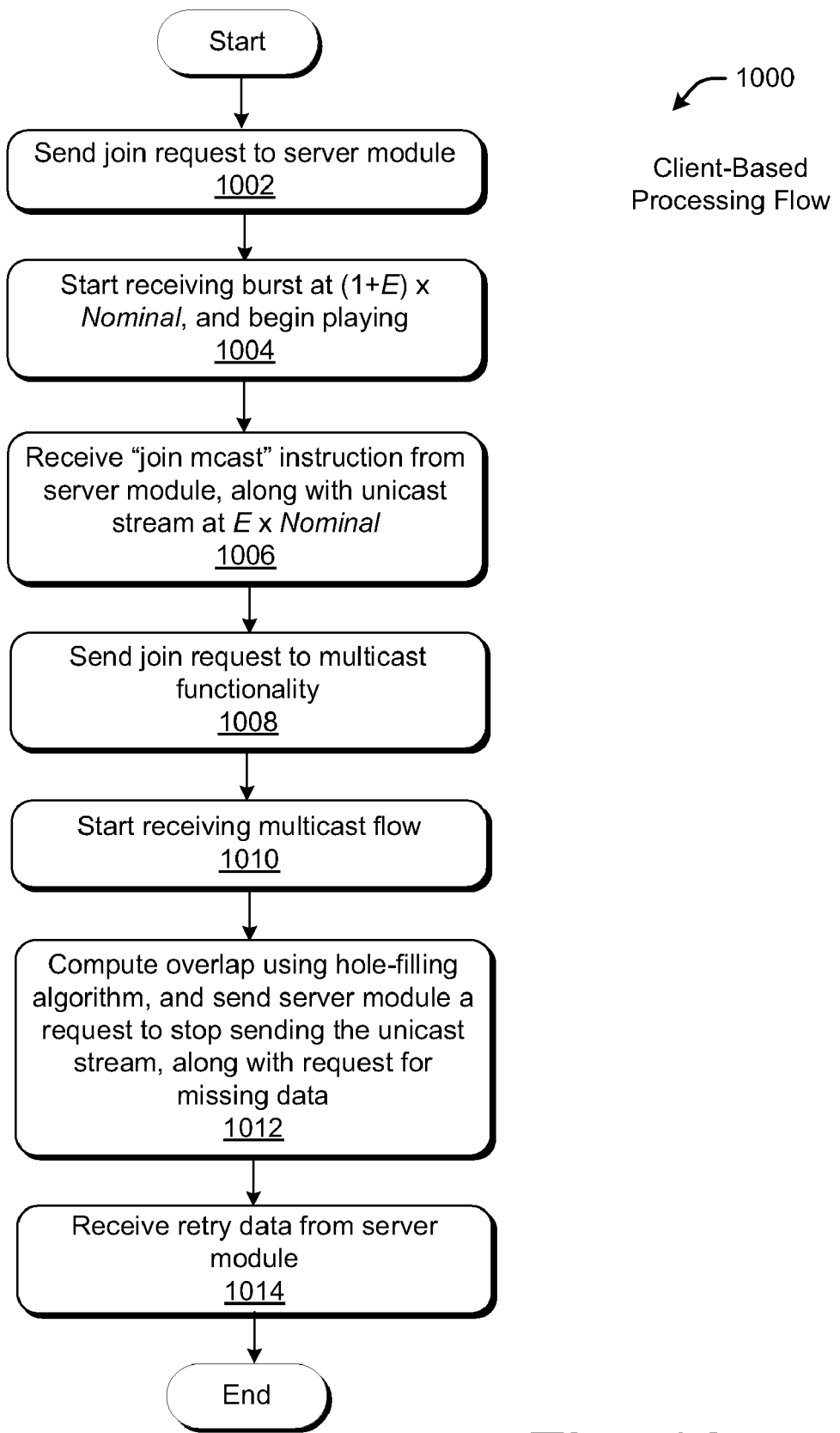
FIG. 10 shows an exemplary procedure, which complements the procedure of FIG. 9, which explains the operation of the client module in performing the rate-limited ACC paradigm.

The segments shown in scenarios 3-A and 3-B of FIG. 10 have the same interpretation as the segments described in FIG. 6, and therefore share the same numeric labels. However, now note that the dotted line, labeled as line 1002, again starts from the end of the second segment 608, but now has a non-zero slope E. The non-zero slope represents the fact that resource information continues to be received at fractional rate E by virtue of the retry activity, so the holes continue to be filled in at this rate. In scenario 2-A (E=0.5), this dotted line 802 does not cross the demand curve 602 into the underflow region 604. But in scenario 2-B (E=0.25), the dotted line 802 does extend into the underflow region 604.

The conditions that demarcate successful operation from unsuccessful operation for the above-described scenarios can be derived as a function of $T_{burst}$ (the amount of time in the initial unicast burst), $T_{join}$ (the amount of time required by the multicast join), and E (the amount of extra capacity allocated to the communication channel).

Starting with scenarios 1-A and 1-B of FIG. 6, the constraint imposed is that the amount of excess buffer attributed to the initial burst itself be sufficient to fill in all of the holes. The following analysis derives the mathematical relationship between $T_{burst}$, $T_{join}$ and E for this constraint.

$$ET_{burst} = T_{buffered}$$
$$T_{buffered} \geq T_{join}/E \Rightarrow \text{satisfiable}$$
$$ET_{burst} \geq T_{join}/E \Rightarrow \text{satisfiable}$$
$$T_{burst}/T_{join} \geq 1/E^2 \Rightarrow \text{satisfiable}$$

One premise of this derivation is that there is a certain amount of time buffered in advance following the burst. Because the entire time to perform retries to account for the join interval is just the join interval divided by the extra bandwidth ratio, the amount of time buffered before the join interval must be greater than that retry time for this scenario to succeed.

Figure 9:
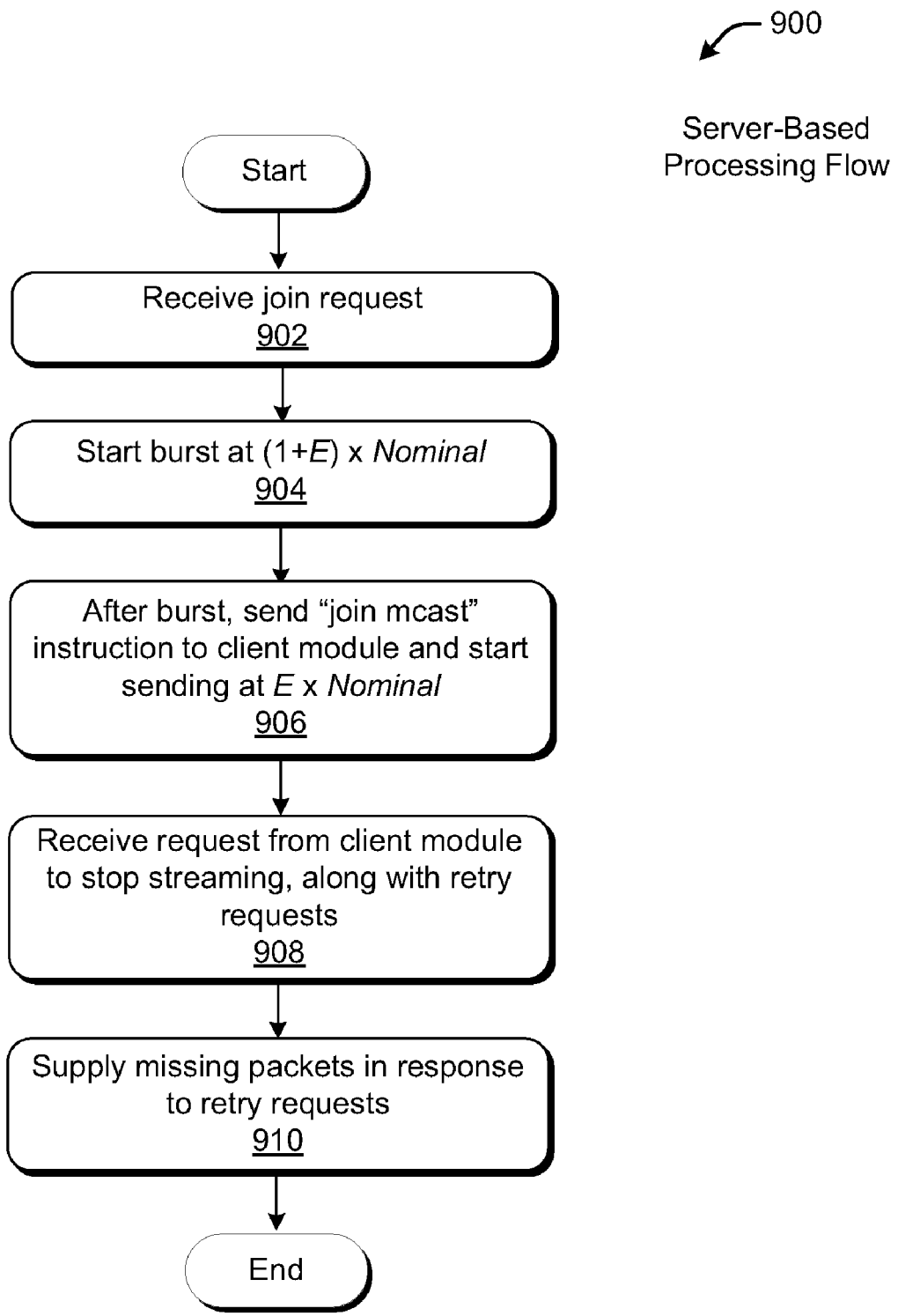
FIG. 9 shows an exemplary procedure which explains the operation of the server module in performing the rate-limited ACC paradigm.

In scenarios 2-A and 2-B of FIG. 9, the constraint imposed is that the amount of excess buffer attributed to the initial burst itself, combined with the E*Nominal unicast stream transmitted during the join interval, be sufficient to fill in all of the holes. The following analysis derives the mathematical relationship between $T_{burst}$, $T_{join}$ and E for this constraint.

$$ET_{burst} = T_{buffered}$$
$$T_{buffered\_after\_join} = (ET_{burst}) - ((1-E)T_{join})$$
$$T_{retry} = (1-E)T_{join}/E$$
$$T_{buffered\_after\_join} \geq T_{retry} \Rightarrow \text{satisfiable}$$
$$(1-E)T_{join}/E \leq (ET_{burst}) - ((1-E)T_{join}) \Rightarrow \text{satisfiable}$$
$$T_{join} \leq E^2 T_{burst} + E^2 T_{join} \Rightarrow \text{satisfiable}$$
$$T_{burst}/T_{join} \geq (1-E^2)/E^2 \Rightarrow \text{satisfiable}$$

One premise of this derivation is that, once the client module 204 has been instructed to switch to the multicast stream 116, advance buffer is being lost at the rate of (1−E) per-time unit. Thus, the amount of time it will take to retry (after the join interval has completed) is the total amount that would have been lost had none been sent during the join interval, minus the quantity that was received during the join interval, divided by the retry bandwidth. There must be at least that much advance buffer available to the client module 204 at the time that the join succeeds. Note that for all E<1, this yields a lower value than the above first scenario (of FIG. 6).

In scenarios 3-A and 3-B of FIG. 10, the constraint imposed is that the amount of excess buffer attributed to the initial burst itself, combined with the E*Nominal unicast stream, and also combined with any retry information received thereafter, be sufficient to fill in all of the holes. In other words, the constraint is simply that the current point of consumption (from the perspective of the delivery timeline) keep abreast of any holes in the client module 204's buffer 224. The following analysis derives the mathematical relationship between $T_{burst}$, $T_{join}$ and E for this constraint.

$$T_{\text{buffered\_after\_join}} = (ET_{burst}) - ((1-E)T_{join})$$

$$T_{retry} = (1-E)T_{join}/E$$

$$T_{\text{buffered\_with\_decay}} \geq T_{retry} \Rightarrow \text{satisfiable}$$

$$(1-E)T_{join}/E \leq \frac{(ET_{burst}) - ((1-E)T_{join})}{(1-E)} \Rightarrow \text{satisfiable}$$

$$((1-E/E)+1)T_{join} \leq (E/(1-E))T_{burst} \Rightarrow \text{satisfiable}$$

$$T_{burst}/T_{join} \geq (1-E)/E^2 \Rightarrow \text{satisfiable}$$

This derivation starts in a similar way to the derivation for FIG. 9. The significant difference is that, instead of using the straight "buffered after join" as the allowable retry time, the present derivation takes account of the fact that extra data is still arriving. Because the extra data is arriving from the beginning of the hole, and is arriving at the rate of E, the amount of time the buffer has to survive is the original time, divided by (1−E).

B. Exemplary Method of Operation

FIGS. 9 and 10 together describe the operation of the functionality of the preceding figures in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

More specifically, FIGS. 9 and 10 restate the operations already described in the context of FIG. 5 in flowchart form. As this material has already been carefully set forth, the discussion of FIGS. 9 and 10 will serve as a summary; the reader is referred back to the discussion of FIG. 5 for a more complete explanation of the subject matter. Again note that the simplifying case of constant bit rate is assumed (which also applies to the worst-case scenario of capped VBR). Section C describes how the procedures can be extended for other scenarios.

FIG. 9 is a procedure 900 which defines operations performed by the server module 202 when a channel change event occurs (or when some other event associated with the start up of a stream occurs). In step 902, the server module 202 receives a request from the client module 204 to receive the initial burst to facilitate start up. Although not shown, this initial period can also involve an investigation of what kind of excess buffer is required by the client module 204, and a determination of whether the client module 204 can satisfy such a requirement.

In step 904, the server module 202 starts the burst at the rate of (1+E)*Nominal.

In step 906, the server module 202 sends a join mcast instruction to the client module 204, which instructs the client module 204 to join the multicast stream 96. In this step 906, the server module 202 also begins transmitting at the rate of E*Nominal (and continues at this rate for the ensuring join interval).

In step 908, the server module 202 receives a request from the client module 204 to stop streaming altogether (because the client module 204 has successfully connected to the multicast stream 116). In this step 908, the server module 202 also receives retry requests from the client module 204 corresponding to holes that occurred due to the join interval.

In step 910, the server module 110 sends the retry packets to the client module 204 in response to the retry requests.

FIG. 10 is a procedure 1000 that defines activities performed by the client module 204, and is the counterpart of the server-based activities of FIG. 9.

In step 1002, the client module 204 sends a join request to the server module 202, requesting that the server module 202 commence the transmission of the stream.

In step 1004, the client module 204 starts receiving the server module 202's burst at rate (1+E)*Nominal, and shortly thereafter, begins playing the resource information in the stream.

In step 1006, the client module 204 receives a join cast instruction from the server module 202, which instructs the client module 204 to join the multicast stream 116 enabled by the multicast functionality 112. The client module 204 also receives the last of the unicast burst, followed by a unicast stream at rate E*Nominal.

In step 1008, the client module 204 responds to the server module 202's instruction by sending its own join request to the multicast functionality 112.

In step 1010, in response to the client module 204's request, the client module 204 begins receiving multicast information from the multicast functionality 112. This event marks the end of the join interval.

In step 1012, the client module 204 determines the identity of any holes that have occurred in the steam due to the below-nominal stream transmission during the join interval. In this step 1012, the client module 204 sends a retry request to the server module 202 that asks the server module 202 to supply the missing packets.

In step 1014, the client module 204 receives the missing packets from the server module 202. This has the effect of filling in the holes created by the join interval. If the holes can be filled in prior to the consumption of these holes, then the procedure is deemed successful.

C. Exemplary Variations

The following section describes a number of variations to the systems and procedures set forth above.

C.1. ACC Strategies in Environments with $E \geq 1$.

Several of the examples developed above assumed that E was less than 1.0. However, in other cases, E can be set as equal to or greater than 1.0. This means that the communication channel can accommodate at least two nominal data rate streams at the same time.

Figure 11:
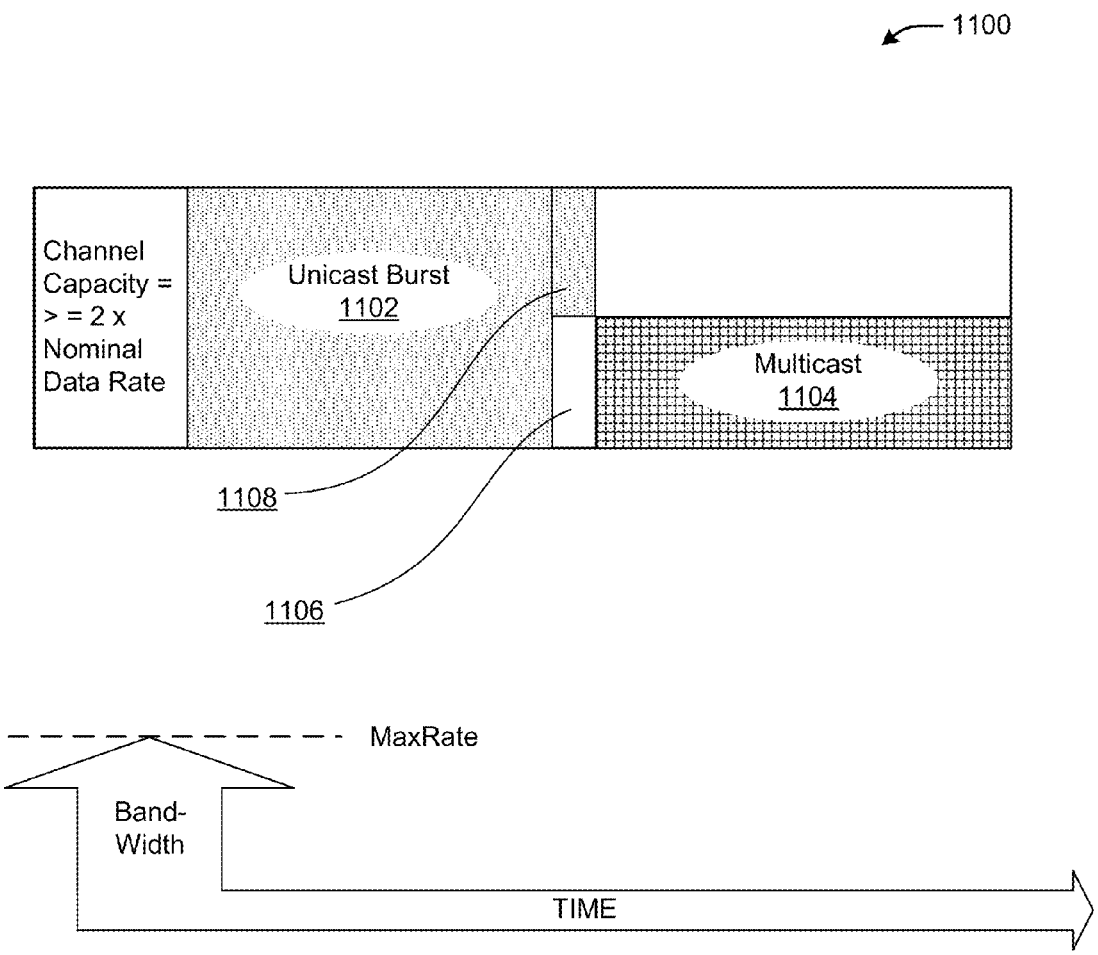
FIG. 11 shows a variation of the representation of FIG. 4, in which the communication channel allocates additional excess capacity compared to the case of FIG. 4.

FIG. 11 shows a representation 1100 of a hybrid unicast/multicast ACC strategy in which $E \geq 1.0$. More specifically, as before, a unicast burst 1102 is followed by a multicast stream 1104. The burst 1102 occurs at a MaxRate level that is at least two times the nominal rate of the stream. A join interval 1106 separates the unicast burst 11102 from the multicast stream 1104. In the join interval, the server module 202 (of FIG. 2) can deliver unicast resource information at some rate, such as 0, or E*Nominal (for the constant data rate or capped VBR case). In the former case, the join interval will cause packets to be missed. These packets can be provided concurrently with the multicast stream 1104 at a rate of E*Nominal. In the latter case (which applies to the depiction shown in FIG. 11), a unicast stream 1108 of E*Nominal can supply data throughout the join interval. Since the unicast stream now remains at a nominal rate or above in the join interval, there is potentially no loss of packets due to the join interval.

C.2. ACC Strategies in Environments with Variable Bit Rates

Several of the examples developed above assumed that the data rate was constant. However, in other cases, a variable bit rate (VBR) can be used, such as a capped variable bit rate. Delivery that is governed by a capped variable bit rate maintains the data rate so that it remains below the maximum rate level (i.e., the cap level) of the stream.

Figure 12:
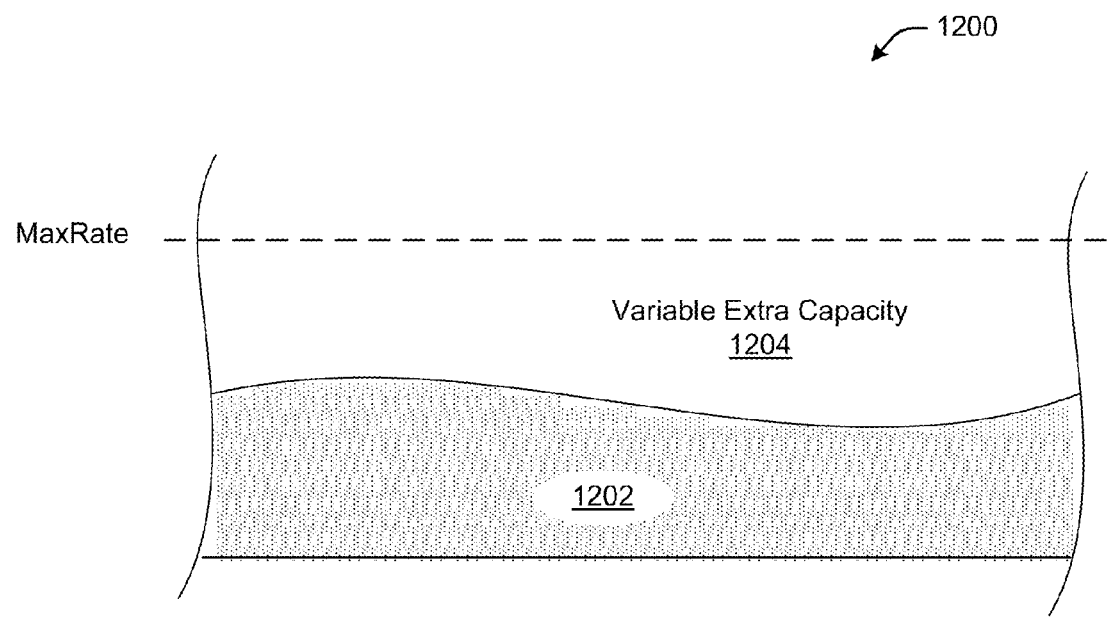
FIG. 12 shows a representation of a communication channel that allocates a variable amount of additional capacity.

FIG. 12 shows a representation of a channel 1200 that supports a variable bit rate. Namely, at any given time, the steady-state transmission of resource information consumes an actual amount 1202 of a total allotted data rate MaxRate, leaving, at any given time, a variable extra capacity 1204. The ACC strategy can utilize the extra capacity 1204 to accomplish the transition between the first mode of delivery to the second mode of delivery. For example, in a first phase, the ACC strategy can pack as much additional information as it can into the unicast burst. In a second phase, the ACC strategy can pack as much unicast data as it can during the join interval. In a third phase, the ACC strategy can pack as much retry data (either supplied from a unicast source or a multicast source) as it can, concurrently with its supply of the multicast stream. Consider, for instance, the last-mentioned case in more detail. The ACC strategy can actively monitor the amount of bandwidth consumed by the multicast stream, ActualCurrentMulticastRate. The extra capacity at any given time available for handling retries is MaxRate−ActualCurrentMulticastRate.

The ACC strategy can measure the available capacity in different ways. In one technique, any actor within the system 100 (such as a client module) can report the data rate that is currently being used to delivery resource information over a particular communication channel. In addition, any actor (such as a client module) can actively probe the available capacity by increasing the data rate at which it receives information, and noting when the communication channel becomes saturated.

The calculations described above in preceding sections can be modified appropriately to reflect a time-varying amount of excess capacity. The existing calculations nevertheless provide valuable insight, as they yield worst-case results (in which a stream always takes up its nominal bit-rate). If a system satisfies these constraints, it can satisfy any scenario that always provides at least (1+E)*Nominal bit-rate. Additional bit-rate available for retries can only improve the performance of the described methods.

In still other scenarios, it is possible to vary the ceiling amount MaxRate of the communication channel.

In still other scenarios, the ACC strategy can be applied in environments that do not impose any MaxRate limitations.

C.3. ACC Strategies for the Unicast Transmission of VOD Assets

Several of the examples developed above assumed that the ACC strategy involved splicing together unicast delivery of resource information with multicast delivery of resource information. However, in other cases, other kinds of delivery modes can be combined together to yield the ACC behavior. Generally, the different modes will still deliver the same pieces of data, but may differ in various respects, such as by providing different timing profiles that govern the delivery of the packets, using different delivery mechanisms, and so forth.

Figure 13:
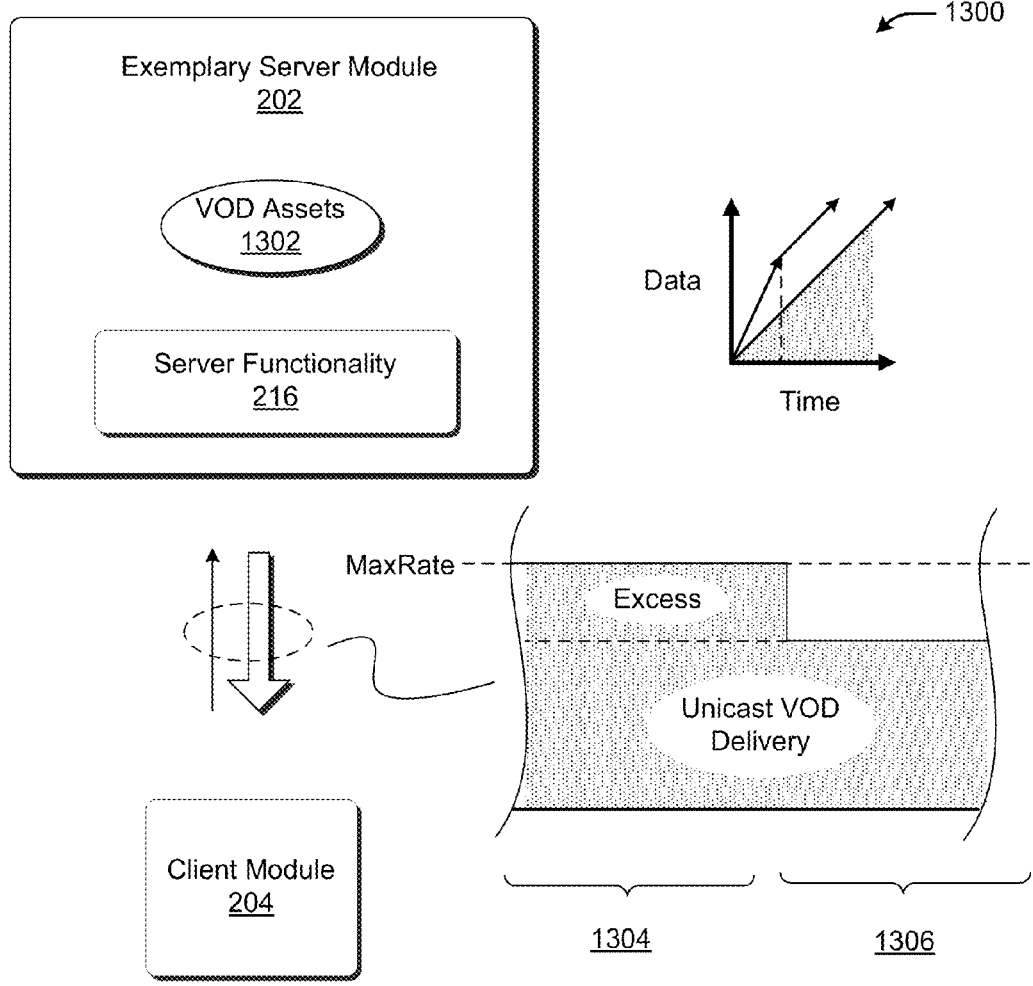
FIG. 13 shows a system which employs a unicast accelerated channel change (ACC) paradigm to deliver video on demand (VOD) assets in a rate-limited environment.

FIG. 13 shows a system 1300 in which the server module 202 delivers VOD assets 1302 to the client module 204 using a pure unicast mode of delivery. In the first delivery mode, the server module 202 bursts the VOD assets at an above-nominal data rate 1304. In the second delivery mode, the server module 202 sends the VOD assets at or below a nominal data rate 1306. (In an alternative environment, two different sources can provide the first and second delivery modes, respectively.) Note that $T_{join}$ may be zero in the above-described case of pure unicast. (In an alternative pure unicast environment, $T_{join}$ may not be zero.) The delivery is constrained at all times by a maximum data rate MaxRate. Again, FIG. 13 shows the case of constant data rates to facilitate discussion, but the system 1300 can also deliver VOD assets using a variable data rate scheme.

C.4. Retry Implementation Variations

Several of the examples developed above assumed that the ACC strategy involved using the server module 202 to handle retry requests from the client module 204. But other entities can perform this task. For example, the multicast functionality 112 can perform this task, some other multitask functionality (not shown) can perform this task (providing the retry packets in a separate multicast stream), or some other actor (not shown) can perform this task.

D. Exemplary Computer Environment

Figure 14:
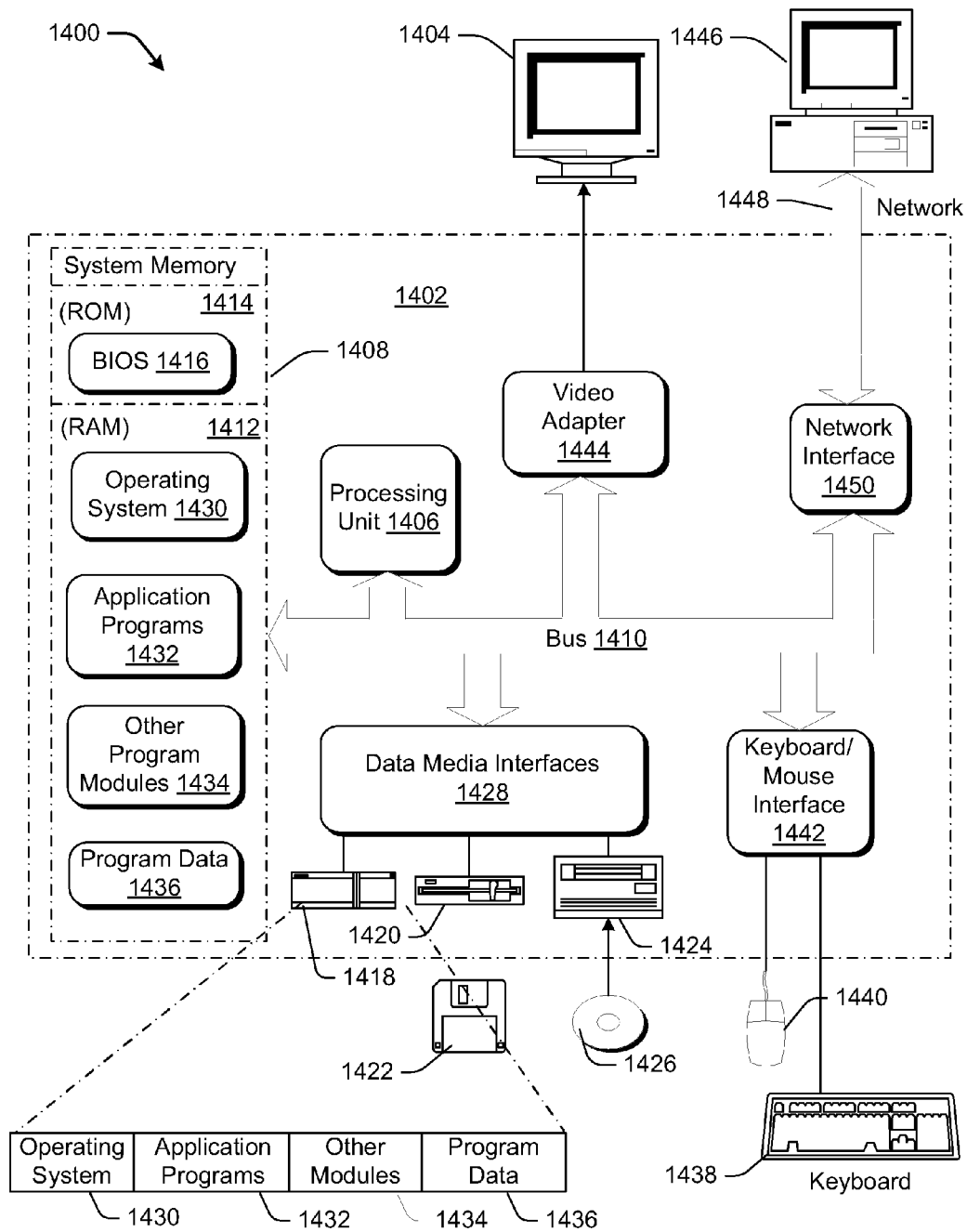
FIG. 14 shows an exemplary computer environment for implementing aspects of the system shown in FIG. 1.

In one exemplary implementation, certain aspects of the system 100 shown in FIG. 1 can be implemented as computer code executed by computer devices. In this case, FIG. 14 provides information regarding an exemplary computer environment 1400 that can be used to implement any such computer devices. Namely, the acquisition functionality 104 can be implemented by a server type computer device, each of the server modules 110 can be implemented by a server type computer device, the configuration tool 118 can be implemented by any kind of computer device, and each of the computer modules 106 can be implemented as any kind of computer device, etc.

The computing environment 1400 includes a general purpose or sever-type computer 1402 and a display device 1404. However, the computing environment 1400 can include other kinds of computing equipment. For example, although not shown, the computer environment 1400 can include handheld or laptop devices, set top boxes, game consoles, mainframe computers, etc. Further, FIG. 14 shows elements of the computer environment 1400 grouped together to facilitate discussion. However, the computing environment 1400 can employ a distributed processing configuration. In a distributed computing environment, computing resources can be physically dispersed throughout the environment.

Exemplary computer 1402 includes one or more processors or processing units 1406, a system memory 1408, and a bus 1410. The bus 1410 connects various system components together. For instance, the bus 1410 connects the processor 1406 to the system memory 1408. The bus 1410 can be implemented using any kind of bus structure or combination of bus structures, including a memory bus or memory controller, a peripheral bus, an accelerated graphics port, and a processor or local bus using any of a variety of bus architectures.

Computer 1402 can also include a variety of computer readable media, including a variety of types of volatile and non-volatile media, each of which can be removable or non-removable. For example, system memory 1408 includes computer readable media in the form of volatile memory, such as random access memory (RAM) 1412, and non-volatile memory, such as read only memory (ROM) 1414. ROM 1414 includes an input/output system (BIOS) 1416 that contains the basic routines that help to transfer information between elements within computer 1402, such as during start-up. RAM 1412 typically contains data and/or program modules in a form that can be quickly accessed by processing unit 1406.

Other kinds of computer storage media include a hard disk drive 1418 for reading from and writing to a non-removable, non-volatile magnetic media, a magnetic disk drive 1420 for reading from and writing to a removable, non-volatile magnetic disk 1422 (e.g., a "floppy disk"), and an optical disk drive 1424 for reading from and/or writing to a removable, non-volatile optical disk 1426 such as a CD-ROM, DVD-ROM, or other optical media. The hard disk drive 1418, magnetic disk drive 1420, and optical disk drive 1424 are each connected to the system bus 1410 by one or more data media interfaces 11428. Alternatively, the hard disk drive 1418, magnetic disk drive 1420, and optical disk drive 1424 can be connected to the system bus 1410 by a SCSI interface (not shown), or other coupling mechanism. Although not shown, the computer 1402 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1402. For instance, the readable media can store the operating system 1430, application-specific functionality 1432, other program modules 1434, and program data 1436.

The computer environment 1400 can include a variety of input devices. For instance, the computer environment 1400 includes the keyboard 1438 and a pointing device 1440 (e.g., a "mouse") for entering commands and information into computer 1402. The computer environment 1400 can include other input devices (not illustrated), such as a microphone, joystick, game pad, satellite dish, serial port, scanner, card reading devices, digital or video camera, etc. Input/output interfaces 1442 couple the input devices to the processing unit 1406. More generally, input devices can be coupled to the computer 1402 through any kind of interface and bus structures, such as a parallel port, serial port, game port, universal serial bus (USB) port, etc.

The computer environment 1400 also includes the display device 1404. A video adapter 1444 couples the display device 1404 to the bus 1410. In addition to the display device 1404, the computer environment 1400 can include other output peripheral devices, such as speakers (not shown), a printer (not shown), etc.

Computer 1402 operates in a networked environment using logical connections to one or more remote computers, such as a remote computing device 1446. The remote computing device 1446 can comprise any kind of computer equipment, including a general purpose personal computer, portable computer, a server, etc. Remote computing device 1446 can include all of the features discussed above with respect to computer 1402, or some subset thereof.

Any type of network 1448 can be used to couple the computer 1402 with remote computing device 1446, a LAN, etc. The computer 1402 couples to the network 1448 via network interface 1450, which can utilize broadband connectivity, modem connectivity, DSL connectivity, or other connection strategy. Although not illustrated, the computing environment 1400 can provide wireless communication functionality for connecting computer 1402 with remote computing device 1446 (e.g., via modulated radio signals, modulated infrared signals, etc.).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

Moreover, a number of features were described herein by first identifying exemplary problems that these features can address. This manner of explication does not constitute an admission that others have appreciated and/or articulated the problems in the manner specified herein. Appreciation and articulation of the problems present in the video processing, compression and delivery arts are to be understood as part of the present invention. More specifically, there is no admission herein that the features described in the Background section of this disclosure constitute prior art.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for delivering resource information to a client module, comprising:
    delivering the resource information, using first delivery functionality, at above nominal data rate levels during an initial burst period of data transmission to the client module;
    delivering the resource information at join interval data rate levels during a join interval following the initial burst period, wherein, following the join interval, the client module switches to second delivery functionality for providing the resource information; and
    sending, using the first delivery functionality, retry data comprising a part of the resource information which the client module missed.

2. The method of claim 1 wherein the resource information provided by the first delivery functionality and the resource information provided by the second delivery functionality combine together to provide a resultant stream of resource information in which the primary mode of resource information delivery transitions from the first delivery functionality to the second delivery functionality, and wherein the resultant stream has a data rate that remains below a prescribed data rate limit.

3. The method of claim 2, wherein delivering the resource information, using a first delivery functionality is initiated upon a commencement event.

4. The method of claim 3, wherein the resource information is media information.

5. The method of claim 4, wherein the commencement event is associated with a change by the client module from a previous state to a new state, wherein the new state involves a selection of a new program that provides the resource information to be consumed by the client module.

6. The method of claim 5, wherein the commencement event is associated with a change by the client module from an old program, associated with the previous state, to the new program, associated with the new state.

7. The method of claim 4, wherein the prescribed data rate limit provides an amount of excess capacity beyond an amount required to delivery the resource information in a steady-state condition.

8. The method of claim 7, further comprising:
    measuring the amount of excess capacity; and
    selecting data rate levels at which the resource information is delivered using the first delivery functionality and/or the second delivery functionality based on the measured amount of excess capacity.

9. The method of claim 8, wherein the amount of excess capacity is measured by investigating the amount of degradation produced by transmission of resource information at different data rates.

10. A method for receiving a stream of resource information at a client module, comprising:

receiving, via first delivery functionality, resource information at above-nominal data rate levels during an initial burst period of data transmission;

receiving the resource information at join interval data rate levels during a join interval following the burst period;

receiving, via second delivery functionality, the resource information following the join interval;

requesting parts of the resource information which the client module missed;

receiving the missing parts of resource information concurrently with the receipt of the resource information; and using the received missing parts for filling in holes created in the stream.

11. The method of claim 10, wherein:

the first delivery functionality comprises unicast server-based functionality, and the first delivery of resource information provides a unicast stream of the resource information; and the second delivery functionality comprises multicast functionality, and the second delivery of resource information provides a multicast stream of the resource information.

12. The method of claim 1, wherein:

the first delivery functionality comprises unicast server-based functionality configured to deliver the resource information in a unicast stream at first data rate levels for an initial period of time; and the second delivery functionality comprises the unicast server-based functionality configured to deliver the resource information in a unicast stream at second data rate levels following the initial period of time.

13. The method of claim 10, wherein the resource information is video on demand (VOD) resource information.

14. The method of claim 10, wherein:

the first delivery functionality comprises delivering the resource information at first data rate levels for an initial period of time; and the second delivery functionality comprises delivering the resource information at second data rate levels.

15. The method of claim 14, wherein the first data rate levels and the second data rate levels define constant respective data rates.

16. The method of claim 14, wherein the first data rate levels and the second data rate levels define varying respective data rates.

17. The method of claim 14, wherein the first data rate levels are data rates which exceed a nominal data rate used to deliver the resource information by an excess amount, and the second data rate levels are data rates which remains at or below the nominal data rate.

18. The method of claim 17, wherein the excess amount is less than the nominal data rate.

19. The method of claim 17, wherein the excess amount is equal to or greater than the nominal data rate.

20. The method of claim 17, wherein the excess amount varies depending on a time-varying amount of excess capacity available.

21. The method of claim 17, wherein the excess amount is specified as a fraction E of the nominal data rate.

22. The method of claim 14, wherein there is a join interval that separates the delivery of resource information at the first data rate levels and the delivery of resource information at the second data rate levels, wherein, in the join interval, the first delivery of resource information is provided at join interval date rate levels.

23. The method of claim 22, wherein a length of the join interval is based an amount of time required by the client module to couple to the second delivery functionality to receive the second delivery of the resource information.

24. The method of claim 23, wherein the join interval is shortened to a minimum amount of time that is required by the client module to couple to the second delivery functionality, wherein the first delivery functionality continues to deliver the resource information in a time period defined by that minimum amount of time.

25. The method of claim 22, wherein the join interval data rates dynamically vary based on a time-varying amount of excess capacity available to deliver resource information.

26. The method of claim 22, wherein the join interval data rate levels are data rates at or above a nominal data rate used to deliver the resource information.

27. The method of claim 22, wherein the join interval data rate levels are data rates below a nominal data rate used to deliver the resource information.

28. The method of claim 27, wherein the join interval data rate levels are data rates of 0.

29. The method of claim 27, wherein the join interval data rates are specified as a fraction E of the nominal data rate.

30. The method of claim 27, wherein the delivery of the resource information at below-nominal join interval rates during the join interval causes parts of the first stream of resource information to be missed by the client module.

31. A method for delivering resource information to a client module, comprising:

delivering the resource information, using first delivery functionality, at above-nominal data rate levels during an initial burst period of data transmission to the client module;

delivering the resource information at join interval data rate levels during a join interval following the initial burst period, wherein, following the join interval, the client module switches to second delivery functionality for providing the resource information; and delivering again, contemporaneously with delivery of the resource information by the second delivery functionality, at least a part of the resource information, delivered using the first delivery functionality, which the client module missed.

32. The method of claim 31, wherein the first delivery functionality and the second delivery functionality comprise unicast delivery functionality and multicast delivery functionality, respectively.

* * * * *